United States Patent
Yu

(10) Patent No.: US 11,968,668 B2
(45) Date of Patent: Apr. 23, 2024

(54) DATA TRANSMISSION METHOD AND DEVICE

(71) Applicant: HUAWEI TECHNOLOGIES CO., LTD., Guangdong (CN)

(72) Inventor: Zheng Yu, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 408 days.

(21) Appl. No.: 17/400,841

(22) Filed: Aug. 12, 2021

(65) Prior Publication Data

US 2021/0385843 A1 Dec. 9, 2021

Related U.S. Application Data

(63) Continuation of application No. PCT/CN2019/075289, filed on Feb. 15, 2019.

(51) Int. Cl.
*H04W 72/20* (2023.01)
*H04L 1/1812* (2023.01)
*H04W 72/1263* (2023.01)

(52) U.S. Cl.
CPC ........... *H04W 72/20* (2023.01); *H04L 1/1819* (2013.01); *H04W 72/1263* (2013.01)

(58) Field of Classification Search
CPC .. H04W 72/20; H04W 72/1263; H04L 1/1819
See application file for complete search history.

(56) References Cited

U.S. PATENT DOCUMENTS

| | | |
|---|---|---|
| 2018/0167932 A1 | 6/2018 | Papasakellariou |
| 2020/0177320 A1* | 6/2020 | Ren ...................... H04W 72/23 |

FOREIGN PATENT DOCUMENTS

| | | |
|---|---|---|
| CN | 105052067 A | 11/2015 |
| CN | 108337733 A | 7/2018 |

(Continued)

OTHER PUBLICATIONS

ZTE et al.,"Summary on Multiple TB scheduling enhancement for NB-IOT",3GPP TSG-RAN WG1 Meeting #95 Spokane, USA, Nov. 12-16, 2018,R1 1813713,total:11pages.

(Continued)

*Primary Examiner* — Myron Wyche
(74) *Attorney, Agent, or Firm* — WOMBLE BOND DICKINSON (US) LLP

(57) ABSTRACT

A data transmission method and a device are disclosed. The data transmission method includes: a first communications device receives first information sent by a second communications device. The first information is used to indicate one or more of transport block set information, maximum transport block quantity information, transport block information, and first combination set information. The first communications device determines, based on the first information, a quantity of transport blocks scheduled by using control information, and a HARQ process number corresponding to each transport block in the transport blocks scheduled by using the control information. The first communications device sends data to the second communications device based on the determined quantity of transport blocks and the determined HARQ process number corresponding to each transport block, or receives, based on the determined quantity of transport blocks and the determined HARQ process number corresponding to each transport block, data.

20 Claims, 6 Drawing Sheets

(56) References Cited

FOREIGN PATENT DOCUMENTS

| CN | 108809530 A   | 11/2018 |
| CN | 109150419 A   | 1/2019  |
| EP | 3328145 A1    | 5/2018  |
| WO | 2018064583 A1 | 4/2018  |
| WO | 2019029639 A1 | 2/2019  |

OTHER PUBLICATIONS

Lenovo, Motorola Mobility et al., "Design of scheduling of multiple DL/UL TB for Rel.16 NBIoT",3GPP TSG RAN WG1 Meeting #94bis,Chengdu, China, Oct. 8-12, 2018,R1-1810584,total:3pages.

* cited by examiner

| Quantity of transport blocks | First HARQ process number |
|---|---|
| L=1 | 0　　　　1　　　　　2　　　　3 |
| L=2 | 0　　　　1　　　　　2　　　　3 |
| L=3 | 0　　　　1　　　　2 |
| L=4 | 0 |

| Quantity of transport blocks | First HARQ process number |
|---|---|
| L=1 | 0　　　1　　　　2　　3 |
| L=2 | 0　　　1　　　　2　　3 |
| L=3 | 0　　　1　　　　2 |
| L=4 | 0 |

| Quantity of transport blocks | First HARQ process number | | | |
|---|---|---|---|---|
| L=1 | 0 | 1 | 2 | 3 |
| L=2 | 0 | 1 | 2 | 3 |
| L=3 | 0 | 1 | 2 | |
| L=4 | 0 | | | |

FIG. 4c

| Quantity of transport blocks | First HARQ process number | | | |
|---|---|---|---|---|
| L=1 | 0 | 1 | 2 | 3 |
| L=2 | 0 | 1 | 2 | 3 |
| L=3 | 0 | 1 | 2 | |
| L=4 | 0 | | | |

FIG. 4d

DATA TRANSMISSION METHOD AND DEVICE

CROSS-REFERENCE TO RELATED APPLICATIONS

This application is a continuation of International Application No. PCT/CN2019/075289, filed on Feb. 15, 2019, the disclosure of which is hereby incorporated by reference in its entirety.

TECHNICAL FIELD

Embodiments of this application relate to the communications field, and in particular, to a data transmission method and a device.

BACKGROUND

In a communications system, one piece of control information (CI) is usually used to schedule one transport block (TB). A data channel may be a physical downlink data channel or a physical uplink data channel.

To reduce CI transmission overheads and reduce transmission resources, one piece of CI may be used to schedule a plurality of data channels or a plurality of transport blocks.

When one piece of CI is used to schedule a plurality of transport blocks, the CI needs to indicate a quantity of scheduled transport blocks and a hybrid automatic repeat request (HARQ) process number corresponding to each transport block.

In the conventional technology, when one piece of CI is used to schedule a plurality of transport blocks, the CI needs to indicate both a quantity of scheduled transport blocks and a HARQ process number corresponding to each transport block. Consequently, very high indication overheads are present.

In the conventional technology, bit overheads for scheduling a transport block by using CI are excessively high. Especially, in consideration of high-reliability control channel performance, higher bit overheads indicate more transmission resources. How to reduce indication overheads for scheduling a transport block by using CI still needs to be resolved.

SUMMARY

Embodiments of this application provide a data transmission method and a device, to reduce indication overheads for scheduling a transport block by using control information, and occupy fewer transmission resources.

To resolve the foregoing and other technical problem, the embodiments of this application provide at least the following technical solutions.

An embodiment provides a data transmission method, including: A first communications device receives first information sent by a second communications device. The first information is used to indicate one or more of transport block set information, maximum transport block quantity information, transport block information, or first combination set information. The transport block set information indicates a transport block quantity range and/or a transport block quantity set. The maximum transport block quantity information indicates a maximum quantity of transport blocks that can be scheduled by using control information. The transport block information indicates a quantity of transport blocks scheduled by using the control information, and/or a hybrid automatic repeat request HARQ process number of a first transport block in the transport blocks scheduled by using the control information, and/or HARQ process numbers of all the transport blocks scheduled by using the control information. Each combination in a first combination set is used to determine a quantity of transport blocks scheduled by using the control information and a HARQ process number of a first transport block in the transport blocks scheduled by using the control information, or is used to determine HARQ process numbers of all the transport blocks scheduled by using the control information. The first communications device determines, based on the first information, a quantity of transport blocks scheduled by using the control information, and a HARQ process number corresponding to each transport block in the transport blocks scheduled by using the control information. The first communications device sends data to the second communications device based on the determined quantity of transport blocks and the determined HARQ process number corresponding to each transport block, or the first communications device receives, based on the determined quantity of transport blocks and the determined HARQ process number corresponding to each transport block, data sent by the second communications device.

It can be learned from the foregoing example description of embodiments of this application that, to enable the first communications device to obtain a quantity of transport blocks and a HARQ process number corresponding to each transport block that are determined by the second communications device, the second communications device may generate one piece of first information, and send the first information to the first communications device. Therefore, the first communications device can obtain, based on the received first information, the quantity of transport blocks and the HARQ process number corresponding to each transport block that are determined by the second communications device. To reduce indication overheads of control information, in embodiments of this application, the first information generated by the second communications device may be used to indicate one or more of the following information: transport block set information, maximum transport block quantity information, transport block information, or first combination set information. In embodiments of this application, a HARQ process number corresponding to each transport block scheduled by using downlink information can be limited, so that bit overheads of the control information can be reduced, and transmission performance of the control information can be improved.

In an embodiment, a first communications device receives first information sent by a second communications device includes: The first communications device receives higher layer signaling sent by the second communications device, where the higher layer signaling includes the first information. Alternatively, the first communications device receives control information sent by the second communications device, where the control information includes the first information. After the second communications device generates the first information, the second communications device may send the first information in a plurality of manners. For example, the second communications device may use higher layer signaling, and the higher layer signaling may include the first information. Therefore, the first communications device may receive the higher layer signaling, and may obtain, by parsing the higher layer signaling, the first information generated by the second communications device. For example, the higher layer signaling may include RRC signaling. In addition, the second communications device may use physical layer signaling, and the physical layer signaling may include the first information. Therefore, the first communications device may receive the physical layer signaling, and may obtain, by parsing the physical layer signaling, the first information generated by the second communications device. For example, the physical layer signaling may include the foregoing control information. Further, the control information may include the first information.

An embodiment provides a data transmission method, including: A second communications device determines a quantity of transport blocks scheduled by using control information, and a hybrid automatic repeat request HARQ process number corresponding to each transport block in the transport blocks scheduled by using the control information. The second communications device generates first information, and sends the first information to a first communications device. The first information is used to indicate one or more of transport block set information, maximum transport block quantity information, transport block information, or first combination set information. The transport block set information indicates a transport block quantity range and/or a transport block quantity set. The maximum transport block quantity information indicates a maximum quantity of transport blocks that can be scheduled by using the control information. The transport block information indicates a quantity of transport blocks scheduled by using the control information, and/or a hybrid automatic repeat request HARQ process number of a first transport block in the transport blocks scheduled by using the control information, and/or HARQ process numbers of all the transport blocks scheduled by using the control information. Each combination in a first combination set is used to determine a quantity of transport blocks scheduled by using the control information and a HARQ process number of a first transport block in the transport blocks scheduled by using the control information, or is used to determine HARQ process numbers of all the transport blocks scheduled by using the control information. The second communications device sends data to the first communications device based on the determined quantity of transport blocks and the determined HARQ process number corresponding to each transport block, or the second communications device receives, based on the determined quantity of transport blocks and the determined HARQ process number corresponding to each transport block, data sent by the first communications device.

In an embodiment, the second communications device sends the first information to a first communications device includes: The second communications device sends higher layer signaling to the first communications device, where the higher layer signaling includes the first information. Alternatively, the second communications device sends control information to the first communications device, where the control information includes the first information.

An embodiment provides a communications device. The communications device is in an embodiment a first communications device, and the first communications device includes: a receiving module, configured to receive first information sent by a second communications device, where the first information is used to indicate one or more of transport block set information, maximum transport block quantity information, transport block information, or first combination set information; the transport block set information indicates a transport block quantity range and/or a transport block quantity set; the maximum transport block quantity information indicates a maximum quantity of transport blocks that can be scheduled by using control information; the transport block information indicates a quantity of transport blocks scheduled by using the control information, and/or a hybrid automatic repeat request HARQ process number of a first transport block in the transport blocks scheduled by using the control information, and/or HARQ process numbers of all the transport blocks scheduled by using the control information; and each combination in a first combination set is used to determine a quantity of transport blocks scheduled by using the control information and a HARQ process number of a first transport block in the transport blocks scheduled by using the control information, or is used to determine HARQ process numbers of all the transport blocks scheduled by using the control information; a processing module, configured to determine, based on the first information, a quantity of transport blocks scheduled by using the control information, and a HARQ process number corresponding to each transport block in the transport blocks scheduled by using the control information; and a sending module, configured to send data to the second communications device based on the determined quantity of transport blocks and the determined HARQ process number corresponding to each transport block, where the receiving module is further configured to receive, based on the determined quantity of transport blocks and the determined HARQ process number corresponding to each transport block, data sent by the second communications device.

An embodiment provides a communications device. The communications device is in an embodiment a second communications device, and the second communications device includes: a processing module, configured to determine a quantity of transport blocks scheduled by using control information, and a hybrid automatic repeat request HARQ process number corresponding to each transport block in the transport blocks scheduled by using the control information, where the processing module is further configured to generate first information; a sending module, configured to send the first information to a first communications device, where the first information is used to indicate one or more of transport block set information, maximum transport block quantity information, transport block information, or first combination set information; the transport block set information indicates a transport block quantity range and/or a transport block quantity set; the maximum transport block quantity information indicates a maximum quantity of transport blocks that can be scheduled by using the control information; the transport block information indicates a quantity of transport blocks scheduled by using the control information, and/or a hybrid automatic repeat request HARQ process number of a first transport block in the transport blocks scheduled by using the control information, and/or HARQ process numbers of all the transport blocks scheduled by using the control information; and each combination in a first combination set is used to determine a quantity of transport blocks scheduled by using the control information and a HARQ process number of a first transport block in the transport blocks scheduled by using the control information, or is used to determine HARQ process numbers of all the transport blocks scheduled by using the control information; and the sending module is further configured to send data to the first communications device based on the determined quantity of transport blocks and the determined HARQ process number corresponding to each transport block; and a receiving module, configured to receive, based on the determined quantity of transport blocks and the determined HARQ process number corresponding to each transport block, data sent by the first communications device.

In an embodiment, the first information includes a first field. When a bit state of the first field is a first state, it indicates that the control information is used to schedule one transport block; or when a bit state of the first field is a second state, it indicates that the control information is used to schedule a plurality of transport blocks. The first field includes one or more bits, the first state includes one or more bit states of the first field, and the second state includes one or more bit states of the first field. In an embodiment, the first field includes one or more bits, the first state includes one or more bit states of the first field, and the second state includes one or more bit states of the first field. A quantity of bits included in the first field and each state included in the first field are not limited herein. In an embodiment, the first field in the first information is used to indicate whether the control information is used to schedule one or more transport blocks. Different bit states of the first field are used to indicate whether the control information is used to schedule one or more transport blocks, so that bit overheads of the control information can be reduced, and fewer transmission resources can be occupied.

In an embodiment, the control information is used to schedule a plurality of transport blocks. HARQ process numbers of the other transport blocks than a first transport block in the plurality of transport blocks are determined based on a HARQ process number of the first transport block; and/or each transport block in the plurality of transport blocks corresponds to one HARQ process number, and the plurality of HARQ process numbers corresponding to the plurality of transport blocks are consecutive.

If the control information is used to schedule a plurality of transport blocks, the first information is used to indicate a HARQ process number of a first transport block, and HARQ process numbers of the other transport blocks than the first transport block in the plurality of transport blocks are determined based on the HARQ process number of the first transport block. For example, the HARQ process numbers of the other transport blocks may be obtained by calculating the HARQ process number of the first transport block in a preset calculation manner. For example, the preset calculation manner may include a plurality of calculation rules, which are described in detail in other portions of this application. Each transport block in the plurality of transport blocks corresponds to one HARQ process number, that is, one HARQ process number is configured for each transport block, and the plurality of HARQ process numbers corresponding to the plurality of transport blocks are consecutive. When the first information is used to indicate the HARQ process number of the first transport block, the HARQ process numbers of the other transport blocks may be obtained based on that all the HARQ process numbers are consecutive. For example, the HARQ process number of the first transport block is 1. If the control information is used to schedule three transport blocks in total, the HARQ process numbers of the other three transport blocks start from the HARQ process number 1, and are determined as 2, 3, and 4 according to a rule of consecutiveness.

In an embodiment, the HARQ process numbers corresponding to the other transport blocks than the first transport block in the plurality of transport blocks are determined in ascending order based on the HARQ process number corresponding to the first transport block; or a value $R_n$ of a HARQ process number of an $n^{th}$ transport block in the plurality of transport blocks satisfies the following relationship: $R_n = \{R_1 + n - 1\} \mod N$, where $R_1$ is a value of the HARQ process number of the first transport block, n is a positive integer, mod indicates a modulo operation, and N is a maximum quantity of HARQ processes supported by the control information. The HARQ process numbers corresponding to the other transport blocks than the first transport block in the plurality of transport blocks may be alternatively determined in descending order based on the HARQ process number corresponding to the first transport block. This is not limited herein. In addition, in an embodiment, the HARQ process number corresponding to each transport block in the plurality of transport blocks may be obtained by using the foregoing modulo operation formula. In an actual application scenario, a manner of obtaining the HARQ process number corresponding to each transport block may be determined with reference to a scenario.

In an embodiment, when the control information is used to schedule one transport block, the first information indicates the HARQ process number of the first transport block in a value set $\{0, 1, 2\}$; or when the control information is used to schedule two transport blocks, the first information indicates the HARQ process number of the first transport block in a value set $\{0, 1\}$ or $\{0, 2\}$; or when the control information is used to schedule three transport blocks, the first information indicates the HARQ process number of the first transport block in a value set $\{0, 1\}$; or when the control information is used to schedule four transport blocks, the first information indicates that a value of the HARQ process number of the first transport block is 0. When the control information is used to schedule one transport block, the first information only needs to indicate the HARQ process number of the first transport block in $\{0, 1, 2\}$. For example, the HARQ process number of the first transport block may be 0, 1, or 2. When the control information is used to schedule two transport blocks, the first information only needs to indicate the HARQ process number of the first transport block in the value set $\{0, 1\}$ or $\{0, 2\}$. For example, the HARQ process number of the first transport block may be 0 or 1, or the HARQ process number of the first transport block may be 0 or 2. When the control information is used to schedule three transport blocks, the first information only needs to indicate the HARQ process number of the first transport block in the value set $\{0, 1\}$. For example, the HARQ process number of the first transport block may be 0 or 1. When the control information is used to schedule four transport blocks, the first information indicates that the value of the HARQ process number of the first transport block is 0. In this case, HARQ process numbers of all the transport blocks scheduled by using the control information may be, for example, 0, 1, 2, and 3. For details, refer to example content shown in Table 1 discussed elsewhere in this application. In the foregoing manner, bit overheads of the control information can be reduced.

In an embodiment, when the control information is used to schedule one transport block, the first information indicates the HARQ process number of the first transport block in a value set $\{0, 1\}$ or $\{0, 2\}$; or when the control information is used to schedule two transport blocks, the first information indicates the HARQ process number of the first transport block in a value set $\{0, 1, 2\}$; or when the control information is used to schedule three transport blocks, the first information indicates the HARQ process number of the first transport block in a value set $\{0, 1\}$; or when the control information is used to schedule four transport blocks, the first information indicates that a value of the HARQ process number of the first transport block is 0. When the control information is used to schedule one transport block, the first information only needs to indicate the HARQ process number of the first transport block in the value set $\{0, 1\}$ or $\{0, 2\}$. For example, the HARQ process number of the first transport block may be 0 or 1. For another example, the HARQ process number of the first transport block may be 0 or 2. When the control information is used to schedule two transport blocks, the first information only needs to indicate the HARQ process number of the first transport block in the value set {0, 1, 2}. For example, the HARQ process number of the first transport block may be 0, 1, or 2. When the control information is used to schedule three transport blocks, the first information only needs to indicate the HARQ process number of the first transport block in the value set {0, 1}. For example, the HARQ process number of the first transport block may be 0 or 1. When the control information is used to schedule four transport blocks, the first information indicates that the value of the HARQ process number of the first transport block is 0. In this case, HARQ process numbers of all the transport blocks scheduled by using the control information may be, for example, 0, 1, 2, and 3. In the foregoing manner, bit overheads of the control information can be reduced.

In an embodiment, when the control information is used to schedule one, two, or three transport blocks, the first information indicates the HARQ process number of the first transport block in a value set {0, 1}; and/or when the control information is used to schedule four transport blocks, the first information indicates that a value of the HARQ process number of the first transport block is 0. When the control information is used to schedule one, two, or three transport blocks, the first information only needs to indicate the HARQ process number of the first transport block in the value set {0, 1}. For example, the HARQ process number of the first transport block may be 0 or 1. When the control information is used to schedule four transport blocks, the first information indicates that the value of the HARQ process number of the first transport block is 0. In this case, HARQ process numbers of all the transport blocks scheduled by using the control information may be, for example, 0, 1, 2, and 3. In the foregoing manner, bit overheads of the control information can be reduced.

In an embodiment, the first information includes a first field, and the first field includes one bit, and is used to indicate the transport block set information. When a bit state of the first field is 0, it indicates that the control information is used to schedule one transport block, where the control information further includes a second field, and the second field indicates a HARQ process number of the transport block. Alternatively, when a bit state of the first field is 1, it indicates that the control information is used to schedule a plurality of transport blocks, where the control information further includes a third field, and the third field indicates a quantity of transport blocks scheduled by using the control information and a HARQ process number corresponding to a first transport block, or is used to determine HARQ process numbers of all the transport blocks scheduled by using the control information. The first field includes one bit, and is used to indicate the transport block set information. A bit state of the first field may be 0 or 1. When the bit state of the first field is 0, it indicates that the control information is used to schedule one transport block. The control information further includes a second field, and the second field indicates a HARQ process number of the transport block. When the bit state of the first field is 1, it indicates that the control information is used to schedule a plurality of transport blocks. The control information may further include a third field, and the third field indicates a quantity of transport blocks scheduled by using the control information and a HARQ process number corresponding to a first transport block, or is used to determine HARQ process numbers of all the transport blocks scheduled by using the control information. In the foregoing manner, bit overheads of the control information can be reduced.

In an embodiment, when the control information is used to schedule two or four transport blocks, the first information indicates that a value of the HARQ process number of the first transport block is 0, or when the control information is used to schedule three transport blocks, the first information indicates the HARQ process number of the first transport block in a value set {0, 1}. Alternatively, when the control information is used to schedule two transport blocks, the first information indicates the HARQ process number of the first transport block in a value set {0, 1}, or when the control information is used to schedule three or four transport blocks, the first information indicates that a value of the HARQ process number of the first transport block is 0. When the control information is used to schedule two transport blocks, the first information indicates that the value of the HARQ process number of the first transport block is 0. In this case, a value of a HARQ process number of a second transport block scheduled by using the control information is 1. When the control information is used to schedule four transport blocks, the first information indicates that the value of the HARQ process number of the first transport block is 0. In this case, values of HARQ process numbers of a second transport block, a third transport block, and a fourth transport block scheduled by using the control information are 1, 2, and 3. When the control information is used to schedule three transport blocks, the first information indicates the HARQ process number of the first transport block in the value set {0, 1}, for example, the first information indicates that the value of the HARQ process number of the first transport block is 0. In this case, values of HARQ process numbers of a second transport block and a third transport block scheduled by using the control information are 1 and 2. The first information indicates that the value of the HARQ process number of the first transport block is 1. In this case, values of HARQ process numbers of a second transport block and a third transport block scheduled by using the control information are 2 and 3. For details, refer to example content shown in Table 2a and Table 2b described elsewhere in this application. In the foregoing manner, bit overheads of the control information can be reduced.

In an embodiment, the first information includes a first field, and the first field includes one bit. When a bit state of the first field is 0, the control information is used to schedule a transport block within a first transport block quantity range, and the control information further includes a fourth field, where the fourth field indicates a HARQ process number of a first transport block in a plurality of transport blocks scheduled within the first transport block quantity range; and/or when a bit state of the first field is 1, the control information is used to schedule a transport block within a second transport block quantity range, and the control information further includes a fourth field, where the fourth field indicates a HARQ process number of a first transport block in a plurality of transport blocks scheduled within the second transport block quantity range. The control information is used to schedule a transport block within a first transport block quantity range or a transport block within a second transport block quantity range. For example, the first transport block quantity range may be {1, 3}. In this case, the second transport block quantity range is {2, 4}. The control information further includes a fourth field, or when the first information is higher layer signaling, the first information includes the foregoing fourth field. The fourth field is used to indicate a HARQ process number of a first transport block in a plurality of transport blocks scheduled within the first transport block quantity range, or a HARQ process number of a first transport block in a plurality of transport blocks scheduled within the second transport block quantity range. In the foregoing manner, only the HARQ process number of the first transport block needs to be indicated, and a HARQ process number of another transport block scheduled by using the control information does not need to be indicated, so that bit overheads of the control information can be reduced.

In an embodiment, the first transport block quantity range is {1, 3}, the control information is used to schedule A transport blocks, the first information indicates the HARQ process number of the first transport block in a value set {0, 1}, and A is a value in a value set {1, 3}. Alternatively, the first transport block quantity range is {1, 4}, and when the control information is used to schedule one transport block, the first information indicates the HARQ process number of the first transport block in a value set {0, 1, 2}, or when the control information is used to schedule four transport blocks, the first information indicates that a value of the HARQ process number of the first transport block is 0. That the first transport block quantity range is {1, 3} indicates that a quantity of transport blocks scheduled by using the control information can only be a value in {1, 3}, and the first information may indicate that the HARQ process number of the first transport block is 0 or 1. Alternatively, the first transport block quantity range is {1, 4}, and when the control information is used to schedule one transport block, the first information indicates that the HARQ process number of the first transport block is 0, 1, or 2. When the control information is used to schedule four transport blocks, the first information indicates that the value of the HARQ process number of the first transport block is 0. In this case, HARQ process numbers of the other three transport blocks scheduled by using the control information are 0, 1, and 2. In the foregoing manner, only the HARQ process number of the first transport block needs to be indicated, and a HARQ process number of another transport block scheduled by using the control information does not need to be indicated, so that bit overheads of the control information can be reduced.

In an embodiment, the second transport block quantity range is {2, 4}, and when the control information is used to schedule two transport blocks, the first information indicates the HARQ process number of the first transport block in a value set {0, 1, 2}, or when the control information is used to schedule four transport blocks, the first information indicates that a value of the HARQ process number of the first transport block is 0. Alternatively, the second transport block quantity range is {2, 3}, and when the control information is used to schedule two transport blocks, the first information indicates the HARQ process number of the first transport block in a value set {0, 1} or {0, 2}, or when the control information is used to schedule three transport blocks, the first information indicates the HARQ process number of the first transport block in a value set {0, 1}.

In an embodiment, the transport block information indicates a quantity of transport blocks scheduled by using the control information, and the transport block information includes two bits. When a bit state of the transport block information is 00, it indicates that the control information is used to schedule one transport block. Alternatively, when a bit state of the transport block information is any one of bit states 01 to 11, it indicates that the control information is used to schedule a plurality of transport blocks. A HARQ process number of a first transport block in one or more transport blocks scheduled by using the control information is 0, and a plurality of HARQ process numbers corresponding to the plurality of transport blocks are consecutive. The transport block information may be used to indicate a quantity of transport blocks scheduled by using the control information. For example, the transport block information includes two bits. A HARQ process number of a first transport block in one or more transport blocks scheduled by using the control information is 0, and a plurality of HARQ process numbers corresponding to the plurality of transport blocks are consecutive. In this case, none of the HARQ process numbers of the transport blocks needs to be indicated, because the HARQ process number of the first transport block is always 0. In this case, HARQ process numbers of the other transport blocks may be obtained in sequence. For details, refer to example content shown in Table 3 described elsewhere in this application. In the foregoing manner, because there is no need to indicate the HARQ process number of the transport block, bit overheads of the control information can be reduced.

In an embodiment, the higher layer signaling is radio resource control signaling, and the radio resource control signaling includes the first information. When the first information includes the transport block information, and the transport block information indicates only a HARQ process number of a first transport block in transport blocks scheduled by using the control information, the control information indicates a quantity of transport blocks scheduled by using the control information. Alternatively, when the first information includes the maximum transport block quantity information and/or the first combination set, the control information indicates a quantity of transport blocks scheduled by using the control information and a HARQ process number of a first transport block in the transport blocks scheduled by using the control information, or indicates HARQ process numbers of all the transport blocks scheduled by using the control information.

The first information includes the transport block information. If the transport block information indicates only a HARQ process number of a first transport block in transport blocks scheduled by using the control information, the control information indicates a quantity of transport blocks scheduled by using the control information. Therefore, the HARQ process number of the first transport block and the quantity of transport blocks scheduled by using the control information may be determined by using the transport block information and the control information. In another implementation scenario, the first information is higher layer signaling, and when the first information includes the maximum transport block quantity information and/or the first combination set, the control information may indicate a quantity of transport blocks scheduled by using the control information and a HARQ process number of a first transport block in the transport blocks scheduled by using the control information, or indicates HARQ process numbers of all the transport blocks scheduled by using the control information. Whether the control information indicates the HARQ process number of the first transport block or the HARQ process numbers of all the transport blocks depends on an application scenario. This is not limited herein.

In an embodiment, when the first information includes the transport block information, the method further includes: The first communications device receives HARQ process number set information sent by the second communications device. The HARQ process number set information indicates at least one HARQ process number set. The second communications device may further send HARQ process number set information to the first communications device, so that the first communications device can determine at least one HARQ process number set based on the HARQ process number set information. The second communications device may send the HARQ process number set information to the first communications device, so that the second communications device further sends the control information to the first communications device. The control information indicates a HARQ number and/or a quantity of transport blocks in the HARQ process number set determined by the second communications device. Therefore, indication overheads of the control information can be reduced.

In an embodiment, a value of the maximum quantity of transport blocks is a value in a value set {2, 4} or a value in a value set {1, 2, 4}. In an embodiment, the second communications device may limit the maximum quantity of transport blocks scheduled by using the control information, so that the control information only needs to indicate a maximum quantity of transport blocks in the value set {2, 4} or the value set {1, 2, 4}, and does not need to indicate all the transport blocks. Therefore, indication overheads of the control information can be reduced.

In an embodiment, all the transport blocks scheduled by using the control information are initially transmitted transport blocks or retransmitted transport blocks. That all the transport blocks are initially transmitted transport blocks means that transmission manners of all the transport blocks scheduled by using the control information are initial transmission, and that all the transport blocks are retransmitted transport blocks means that transmission manners of all the transport blocks scheduled by using the control information are retransmission. For example, in the control information, one bit may be used to indicate whether all the transport blocks are initially transmitted transport blocks or retransmitted transport blocks, so that the communications device determines, by parsing the control information, whether to initially transmit or retransmit all the transport blocks.

In an embodiment, the first communications device works in a coverage enhancement mode B, a coverage enhancement level 2, or a coverage enhancement level 3.

In an embodiment, the composition modules of the first communications device may further perform the operations described above.

In an embodiment, the composition modules of the second communications device may further perform the operations described above.

An embodiment provides a computer-readable storage medium. The computer-readable storage medium stores instructions, and when the instructions are run on a computer, the computer is enabled to perform the methods disclosed herein.

An embodiment provides a computer program product including instructions. When the computer program product is run on a computer, the computer is enabled to perform the methods disclosed herein.

An embodiment provides a communications device. The communications device may include an entity such as a terminal device or a network device. The communications device includes a processor and a memory. The memory is configured to store instructions. The processor is configured to execute the instructions in the memory, to enable the communications apparatus to perform the methods disclosed herein.

An embodiment provides a chip system. The chip system includes a processor, and is configured to support a communications device to implement functions disclosed herein, for example, sending or processing data and/or information in the methods disclosed herein. In an embodiment, the chip system further includes a memory. The memory is configured to store program instructions and data that are used by the communications device. The chip system may include a chip, or may include a chip and another discrete component.

BRIEF DESCRIPTION OF DRAWINGS

FIG. 4c is another schematic diagram of a set including a quantity of transport blocks scheduled by using control information and a first HARQ process number according to an embodiment;

FIG. 4d is another schematic diagram of a set including a quantity of transport blocks scheduled by using control information and a first HARQ process number according to an embodiment;

DESCRIPTION OF EMBODIMENTS

Figure 1:
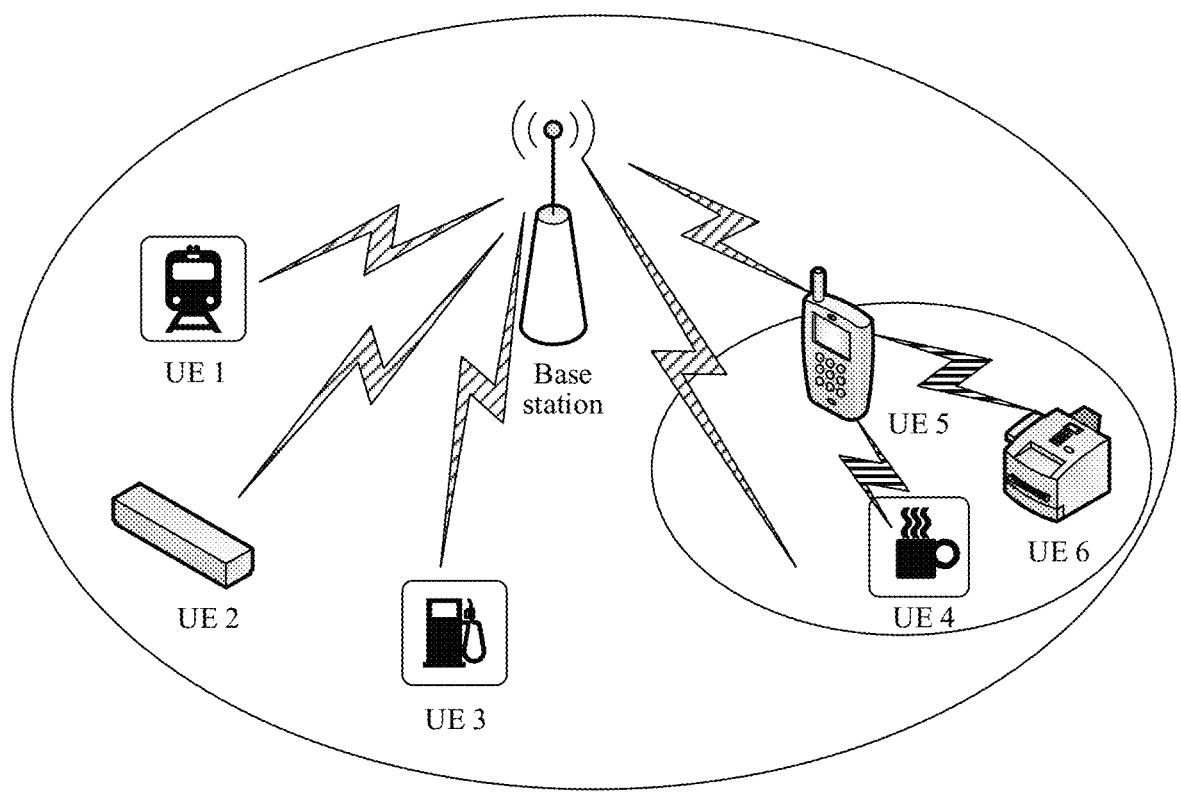
FIG. 1 is a schematic architectural diagram of a system to which a data transmission method is applied according to an embodiment.

Embodiments disclosed in this application may provide a data transmission method and a device, to reduce indication overheads for scheduling a transport block by using control information, and occupy fewer transmission resources.

The following describes embodiments with reference to the accompanying drawings.

In the specification, claims, and accompanying drawings of this application, the terms "first", "second", and the like are intended to distinguish between similar objects but do not necessarily indicate an order or sequence. It should be understood that the terms used in such a way are interchangeable in a proper circumstance, which is merely a discrimination manner that is used when objects having a same attribute are described in this application. In addition, the terms "include", "have", and any other variants mean to cover the non-exclusive inclusion, so that a process, method, system, product, or device that includes a series of units is not necessarily limited to those units, but may include other units not expressly listed or inherent to such a process, method, system, product, or device.

The technical solutions provided by embodiments may be applied to various communications systems for data processing, for example, a code division multiple access (CDMA) system, a time division multiple access (TDMA) system, a frequency division multiple access (FDMA) system, an orthogonal frequency division multiple access (OFDMA) system, a single carrier frequency division multiple access (SC-FDMA) system, and another system. The terms "system" and "network" can be interchanged with each other. The CDMA system may implement wireless technologies such as universal radio terrestrial access (UTRA) and CDMA2000. The UTRA may include a wideband CDMA (WCDMA) technology and other variant technologies of CDMA. The CDMA2000 may cover the interim standard (IS) 2000, the IS-95 standard, and the IS-856 standard. The TDMA system can implement wireless technologies such as global system for mobile communications (GSM). The OFDMA system can implement wireless technologies such as evolved universal terrestrial radio access (E-UTRA), ultra mobile broadband (UMB), IEEE 802.11 (Wi-Fi), IEEE 802.16 (WiMAX), IEEE 802.20, and flash OFDMA. The UTRA corresponds to UMTS, and the E-UTRA corresponds to an evolved version of the UMTS. In 3GPP, long term evolution (LTE) and various versions evolved based on the LTE are new UMTS versions using the E-UTRA. A 5th generation (5G) communications system or new radio (NR) is a next generation communications system under study. In addition, the communications system is further applicable to a future-oriented communications technology, and is applicable to the technical solutions provided by embodiments disclosed in this application. A system architecture and a service scenario described in this application are intended to describe a technical solution provided by embodiments disclosed herein more clearly, and do not constitute a limitation on the technical solutions provided by embodiments disclosed herein. A person of ordinary skill in the art may know that with evolution of a network architecture and emergence of a new service scenario, the technical solutions provided in embodiments disclosed in this application are also applicable to other technical problems.

The communications system provided by embodiments disclosed in this application may include a first communications device and a second communications device, and data transmission may be performed between the first communications device and the second communications device. For example, the first communications device may include a terminal device, and the second communications device may include a network device. Alternatively, the first communications device may include one terminal device, and the second communications device may include another terminal device. Alternatively, the first communications device may include one network device, and the second communications device may include another network device.

FIG. 1 is a schematic structural diagram of a possible radio access network (RAN) according to an embodiment. The RAN may be a base station access system of a 2G network (for example, the RAN includes a base station and a base station controller), may be a base station access system of a 3G network (for example, the RAN includes a base station and an RNC), may be a base station access system of a 4G network (for example, the RAN includes an eNB and an RNC), or may be a base station access system of a 5G network.

The RAN includes one or more second communications devices. For example, the second communications device may include a network device. The network device may be any device with a wireless transceiver function, or a chip disposed in a device with a wireless transceiver function. The network device includes but is not limited to a base station (for example, a base station (BS), a NodeB, an evolved NodeB eNodeB or eNB, a gNodeB or gNB in a fifth generation 5G communications system, a base station in a future communications system, an access node in a Wi-Fi system, a wireless relay node, or a wireless backhaul node) and the like. The base station may be a macro base station, a micro base station, a pico base station, a small cell, a relay station, or the like. A plurality of base stations may support a network using the foregoing one or more technologies, or a future evolved network. The core network may support a network using the foregoing one or more technologies, or a future evolved network. The base station may include one or more co-site or non-co-site transmission reception points (TRP). The network device may alternatively be a radio controller, a centralized unit (CU), a distributed unit (DU), or the like in a cloud radio access network (CRAN) scenario. The network device may alternatively be a server, a wearable device, a vehicle-mounted device, or the like. An example in which the network device is a base station is used for description below. The plurality of network devices may be base stations of a same type or base stations of different types. The base station may communicate with terminal devices 1 to 6, or may communicate with the terminal devices 1 to 6 through a relay station. The terminal devices 1 to 6 may support communication with a plurality of base stations using different technologies. For example, the terminal devices may support communication with a base station supporting an LTE network, may support communication with a base station supporting a 5G network, or may support a dual connection to a base station in an LTE network and a base station in a 5G network. For example, the terminals are connected to a RAN node of a wireless network. Currently, some examples of the RAN node are a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), or a wireless fidelity (Wi-Fi) access point (AP). In a network structure, the network device may include a centralized unit (CU) node, a distributed unit (DU) node, or a RAN device that includes a CU node and a DU node.

The terminal devices 1 to 6 each are also referred to as user equipment (UE), a mobile station (MS), a mobile terminal (MT), a terminal, or the like, and each are a device that provides voice and/or data connectivity for a user, or a chip disposed in the device, for example, a handheld device or a vehicle-mounted device with a wireless connection function. Currently, for example, the terminal device is a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in smart grid, a wireless terminal in transportation safety, a wireless terminal in smart city, or a wireless terminal in smart home. The terminal device provided by embodiments disclosed in this application may be a low-complexity terminal device and/or a terminal device in a coverage enhancement mode A.

In embodiments disclosed in this application, the base station and the UE 1 to the UE 6 form a communications system. In the communications system, the base station sends one or more of system information, an RAR message, or a paging message to one or more of the UE 1 to the UE 6. In addition, the UE 4 to the UE 6 also form a communications system. In the communications system, the UE 5 may function as a base station, and the UE 5 may send one or more of system information, control information, or a paging message to one or more of the UE 4 and the UE 6.

Figure 2:
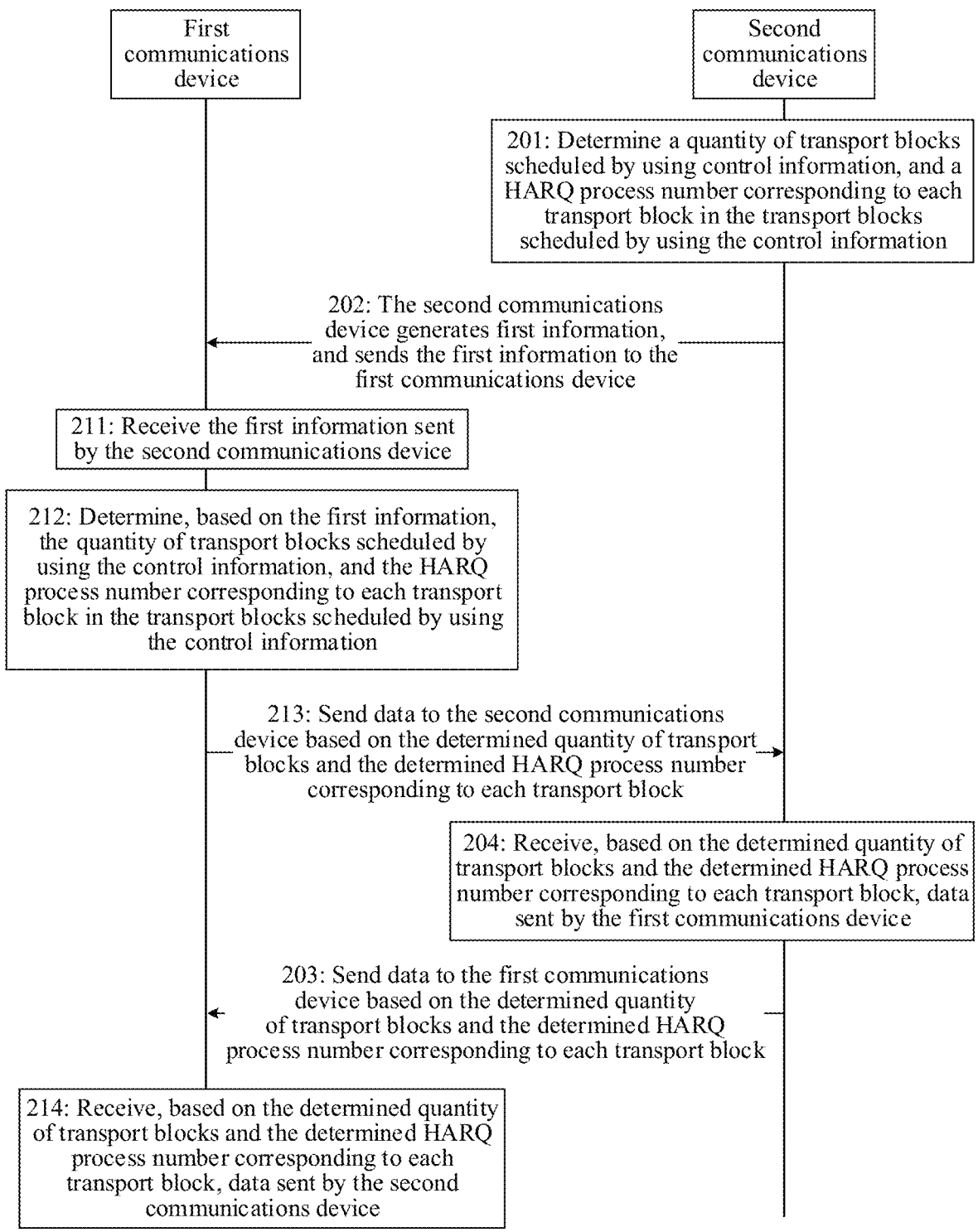
FIG. 2 is a schematic block diagram of a procedure of interaction between a first communications device and a second communications device according to an embodiment.

To resolve a problem in the conventional technology that indication overheads for scheduling a transport block by using control information are excessively high, embodiments may provide the following data transmission method, which is applicable to a scenario in which a transport block is scheduled by using control information. In embodiments disclosed in this application, the control information may be downlink control information. FIG. 2 is a schematic flowchart of interaction between a network device and a terminal device according to an embodiment. The data transmission method provided by embodiments disclosed in this application may include the following operations.

201: A second communications device determines a quantity of transport blocks scheduled by using control information, and a HARQ process number corresponding to each transport block in the transport blocks scheduled by using the control information.

In an embodiment, the control information is generated by the second communications device, and the second communications device delivers a control instruction to a first communications device by using the control information. In a subsequent example, the control information is represented by CI. The second communications device first determines a quantity of transport blocks (TB) used for data transmission. For example, the quantity of transport blocks determined by the second communications device may be 1, 2, 3, or 4. The second communications device further needs to determine a HARQ process number corresponding to each transport block in the transport blocks scheduled by using the control information. The HARQ process number is a HARQ process number corresponding to the transport block, and the HARQ process number may also be referred to as a HARQ process sequence number.

Figures 3, 4A, 4B:
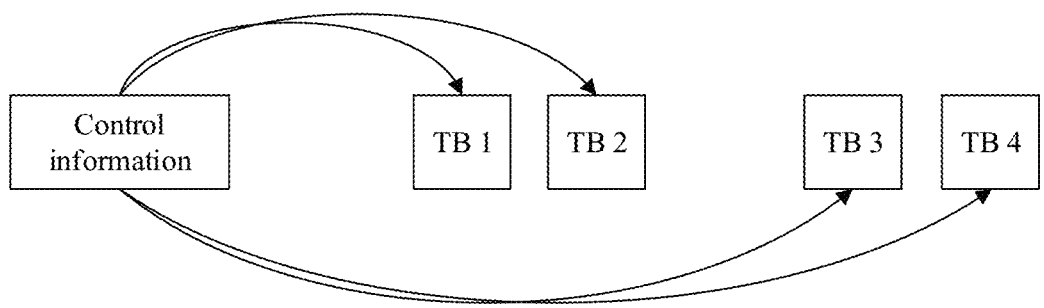
FIG. 3 is a schematic diagram of scheduling a transport block by using control information according to an embodiment.
FIG. 4a is a schematic diagram of a set including a quantity of transport blocks scheduled by using control information and a first HARQ process number according to an embodiment.
FIG. 4b is another schematic diagram of a set including a quantity of transport blocks scheduled by using control information and a first HARQ process number according to an embodiment.

For example, as shown in FIG. 3, the control information may be used to schedule four transport blocks: a TB 1, a TB 2, a TB 3, and a TB 4. The second communications device may further determine a HARQ process number corresponding to each transport block.

In an embodiment, the first communications device may work in a coverage enhancement mode B, a coverage enhancement level 2, or a coverage enhancement level 3. When the first communications device works in the coverage enhancement mode B, a maximum quantity of transport blocks scheduled by using the control information may be 4. The first communications device may alternatively work in another mode, for example, a coverage enhancement mode A, a coverage enhancement level 0, or a coverage enhancement level 1. This is not limited.

202: The second communications device generates first information, and sends the first information to the first communications device.

The first information is used to indicate one or more of transport block set information, maximum transport block quantity information, transport block information, or first combination set information. The transport block set information indicates a transport block quantity range and/or a transport block quantity set.

In an embodiment, to enable the first communications device to obtain a quantity of transport blocks and a HARQ process number corresponding to each transport block that are determined by the second communications device, the second communications device may generate one piece of first information, and send the first information to the first communications device. Therefore, the first communications device can obtain, based on the received first information, the quantity of transport blocks and the HARQ process number corresponding to each transport block that are determined by the second communications device. To reduce indication overheads of control information, in an embodiment, the first information generated by the second communications device may be used to indicate one or more of the following information: transport block set information, maximum transport block quantity information, transport block information, or first combination set information. For example, the first information may be used to indicate only the transport block set information, only the maximum transport block quantity information, only the transport block information, or only the first combination set information. The first information may indicate any two, three, or all of the foregoing four types of information. This is not limited.

In an embodiment, the maximum transport block quantity information indicates a maximum quantity of transport blocks that can be scheduled by using the control information, and the maximum quantity of transport blocks is a maximum value of a quantity of transport blocks that can be scheduled by using the control information. In an embodiment, bit overheads for the first information for indicating the maximum quantity of transport blocks vary with a value of the maximum quantity of transport blocks. For example, when the maximum quantity of transport blocks is 2, the first information only needs one bit to indicate the quantity of transport blocks scheduled by using the control information. For example, the quantity of transport blocks scheduled by using the control information may be 1 or 2. For another example, when the maximum quantity of transport blocks is 4, the first information needs two bits to indicate the quantity of transport blocks scheduled by using the control information. For example, the quantity of transport blocks scheduled by using the control information may be 1, 2, 3, or 4. In this way, different bit sizes may be used based on different service load statuses, so that bit overheads of the CI are reduced, and transmission performance of the CI is improved.

In an embodiment, the transport block information indicates a quantity of transport blocks scheduled by using the control information, and/or a hybrid automatic repeat request HARQ process number of a first transport block in the transport blocks scheduled by using the control information, and/or HARQ process numbers of all the transport blocks scheduled by using the control information. The first information may be used to indicate the transport block information. In an embodiment, the transport block information may indicate at least one piece of the following information: a quantity of transport blocks scheduled by using the control information, a HARQ process number of a first transport block in the transport blocks scheduled by using the control information, or HARQ process numbers of all the transport blocks scheduled by using the control information. The first transport block in the transport blocks scheduled by using the control information may be a first transport block obtained after the transport blocks are sorted according to an original or natural sequence, or may be a first transport block obtained after the transport blocks are re-sorted according to a preset sorting rule in an embodiment. The transport block information may indicate the HARQ process number of the first transport block or the HARQ process numbers of all the transport blocks. A quantity of HARQ process numbers indicated by the transport block information depends on an application scenario. This is not limited herein.

In an embodiment, a first combination set may include a plurality of combinations. Each combination in the first combination set is used to determine a quantity of transport blocks scheduled by using the control information and a HARQ process number of a first transport block in the transport blocks scheduled by using the control information, or is used to determine HARQ process numbers of all the transport blocks scheduled by using the control information. Each combination may include one or more HARQ process numbers and a quantity of transport blocks corresponding to the HARQ process number. For example, the second communications device sends radio resource control (RRC) signaling to the first communications device. In the RRC signaling, one bit is used to indicate one set from two combination sets to serve as the first set. The second communications device may alternatively send DCI to the first communications device. In the DCI, two bits are used to indicate a combination in the first set that is scheduled by using the DCI. The first communications device determines, based on the RRC signaling and the DCI, the quantity of transport blocks scheduled by using the DCI and the HARQ process number corresponding to the first transport block.

In an embodiment, operation 202 in which the second communications device sends the first information to the first communications device includes:

The second communications device sends higher layer signaling to the first communications device, where the higher layer signaling includes the first information.

Alternatively, the second communications device sends control information to the first communications device, where the control information includes the first information.

After the second communications device generates the first information, the second communications device may send the first information in a plurality of manners. For example, the second communications device may use higher layer signaling, and the higher layer signaling may include the first information. Therefore, the first communications device may receive the higher layer signaling, and may obtain, by parsing the higher layer signaling, the first information generated by the second communications device. For example, the higher layer signaling may include RRC signaling. In addition, the second communications device may use physical layer signaling, and the physical layer signaling may include the first information. Therefore, the first communications device may receive the physical layer signaling, and may obtain, by parsing the physical layer signaling, the first information generated by the second communications device. For example, the physical layer signaling may include the foregoing control information. Further, the control information may include the first information.

203: The second communications device sends data to the first communications device based on the determined quantity of transport blocks and the determined HARQ process number corresponding to each transport block. Alternatively, 204: The second communications device receives, based on the determined quantity of transport blocks and the determined HARQ process number corresponding to each transport block, data sent by the first communications device.

In an embodiment, after the second communications device sends the first information to the first communications device, the second communications device may perform data transmission with the first communications device based on the determined quantity of transport blocks and the determined HARQ process number corresponding to each transport block. For example, the second communications device determines, based on the determined quantity of transport blocks, a quantity of transport blocks that can be used for current data transmission, and determines, based on the determined HARQ process number corresponding to each transport block, a HARQ process number that can be used for current data transmission. Similarly, the first communications device determines, based on the determined quantity of transport blocks, a quantity of transport blocks that can be used for current data transmission, and determines, based on the determined HARQ process number corresponding to each transport block, a HARQ process number that can be used for current data transmission.

211: The first communications device receives the first information sent by the second communications device.

The first information is used to indicate one or more of transport block set information, maximum transport block quantity information, transport block information, or first combination set information.

In an embodiment, to enable the first communications device to obtain a quantity of transport blocks and a HARQ process number corresponding to each transport block that are determined by the second communications device, the second communications device may generate one piece of first information, and send the first information to the first communications device. Therefore, the first communications device can obtain, based on the received first information, the quantity of transport blocks and the HARQ process number corresponding to each transport block that are determined by the second communications device. To reduce indication overheads of control information, in an embodiment, the first information generated by the second communications device may be used to indicate one or more of the following information: transport block set information, maximum transport block quantity information, transport block information, or first combination set information. For example, the first information may be used to indicate only the transport block set information, only the maximum transport block quantity information, only the transport block information, or only the first combination set information. The first information may indicate any two, three, or all of the foregoing four types of information. This is not limited.

In an embodiment, the maximum transport block quantity information indicates a maximum quantity of transport blocks that can be scheduled by using the control information, and the maximum quantity of transport blocks is a maximum value of a quantity of transport blocks that can be scheduled by using the control information. For example, bit overheads for the first information for indicating the maximum quantity of transport blocks vary with a value of the maximum quantity of transport blocks. For example, when the maximum quantity of transport blocks is 2, the first information only needs one bit to indicate the quantity of transport blocks scheduled by using the control information. For example, the quantity of transport blocks scheduled by using the control information may be 1 or 2. For another example, when the maximum quantity of transport blocks is 4, the first information needs two bits to indicate the quantity of transport blocks scheduled by using the control information. For example, the quantity of transport blocks scheduled by using the control information may be 1, 2, 3, or 4. In this way, different bit sizes may be used based on different service load statuses, so that bit overheads of the CI are reduced, and transmission performance of the CI is improved.

In an embodiment, the transport block information indicates a quantity of transport blocks scheduled by using the control information, and/or a hybrid automatic repeat request HARQ process number of a first transport block in the transport blocks scheduled by using the control information, and/or HARQ process numbers of all the transport blocks scheduled by using the control information. The first information may be used to indicate the transport block information. In an embodiment, the transport block information may indicate at least one piece of the following information: a quantity of transport blocks scheduled by using the control information, a HARQ process number of a first transport block in the transport blocks scheduled by using the control information, or HARQ process numbers of all the transport blocks scheduled by using the control information. The first transport block in the transport blocks scheduled by using the control information may be a first transport block obtained after the transport blocks are sorted according to an original or natural sequence, or may be a first transport block obtained after the transport blocks are re-sorted according to a preset sorting rule in an embodiment. The transport block information may indicate the HARQ process number of the first transport block or the HARQ process numbers of all the transport blocks. A quantity of HARQ process numbers indicated by the transport block information depends on an application scenario. This is not limited herein.

In an embodiment, a first combination set may include a plurality of combinations. Each combination in the first combination set is used to determine a quantity of transport blocks scheduled by using the control information and a HARQ process number of a first transport block in the transport blocks scheduled by using the control information, or is used to determine HARQ process numbers of all the transport blocks scheduled by using the control information. Each combination may include one or more HARQ process numbers and a quantity of transport blocks corresponding to the HARQ process number. For example, the second communications device sends RRC signaling to the first communications device. In the RRC signaling, one bit is used to indicate one set from two combination sets to serve as the first set. The second communications device may alternatively send DCI to the first communications device. In the DCI, two bits are used to indicate a combination in the first set that is scheduled by using the DCI. The first communications device determines, based on the RRC signaling and the DCI, the quantity of transport blocks scheduled by using the DCI and the HARQ process number corresponding to the first transport block.

In an embodiment, operation 211 in which the first communications device receives the first information sent by the second communications device includes:

The first communications device receives higher layer signaling sent by the second communications device, where the higher layer signaling includes the first information.

The first communications device receives control information sent by the second communications device, where the control information includes the first information.

After the second communications device generates the first information, the second communications device may send the first information in a plurality of manners. For example, the second communications device may use higher layer signaling, and the higher layer signaling may include the first information. Therefore, the first communications device may receive the higher layer signaling, and may obtain, by parsing the higher layer signaling, the first information generated by the second communications device. For example, the higher layer signaling may include RRC signaling. In addition, the second communications device may use physical layer signaling, and the physical layer signaling may include the first information. Therefore, the first communications device may receive the physical layer signaling, and may obtain, by parsing the physical layer signaling, the first information generated by the second communications device. For example, the physical layer signaling may be the foregoing control information. Further, the control information may include the first information.

212: The first communications device determines, based on the first information, the quantity of transport blocks scheduled by using the control information, and the HARQ process number corresponding to each transport block in the transport blocks scheduled by using the control information.

In an embodiment, after the first communications device receives the first information from the second communications device, the first communications device may determine, by parsing the first information, the quantity of transport blocks scheduled by using the control information. For content indicated by the first information, refer to the description in operation 211. The first communications device may further receive the control information from the second communications device, and determine the HARQ process number corresponding to each transport block in the transport blocks scheduled by using the control information. For example, the first information may indicate a HARQ process number corresponding to a first transport block in the transport blocks scheduled by using the control information, and then the first communications device may determine, based on the HARQ process number corresponding to the first transport block, HARQ process numbers corresponding to the other transport blocks scheduled by using the control information. Alternatively, the first information may indicate the HARQ process number corresponding to each transport block in the transport blocks scheduled by using the control information, and then the first communications device may determine, based on the first information, the HARQ process number corresponding to each transport block scheduled by using the control information.

213: The first communications device sends data to the second communications device based on the determined quantity of transport blocks and the determined HARQ process number corresponding to each transport block. Alternatively, 214: The first communications device receives, based on the determined quantity of transport blocks and the determined HARQ process number corresponding to each transport block, data sent by the second communications device.

In an embodiment, after the second communications device sends the first information to the first communications device, the second communications device may perform data transmission with the first communications device based on the determined quantity of transport blocks and the determined HARQ process number corresponding to each transport block. For example, the second communications device determines, based on the determined quantity of transport blocks, a quantity of transport blocks that can be used for current data transmission, and determines, based on the determined HARQ process number corresponding to each transport block, a HARQ process number that can be used for current data transmission. Similarly, the first communications device determines, based on the determined quantity of transport blocks, a quantity of transport blocks that can be used for current data transmission, and determines, based on the determined HARQ process number corresponding to each transport block, a HARQ process number that can be used for current data transmission.

The following describes, by using an example, the first information generated by the second communications device in an embodiment.

In an embodiment, the first information includes a first field.

When a bit state of the first field is a first state, it indicates that the control information is used to schedule one transport block.

Alternatively, when a bit state of the first field is a second state, it indicates that the control information is used to schedule a plurality of transport blocks.

The first field includes one or more bits, the first state includes one or more bit states of the first field, and the second state includes one or more bit states of the first field.

The first field is a part of the first information. For example, the first field may be located at a header of the first information, or may be located at a tail of the first information, or may be located at a location in the first information. This is not limited herein. The first field may have a plurality of bit states. For example, the first field includes at least a first state and a second state. When the bit state of the first field is the first state, the first field may indicate that the control information is used to schedule one transport block. For example, the first state may be 00. Alternatively, when the bit state of the first field is the second state, it indicates that the control information is used to schedule a plurality of transport blocks. The plurality of transport blocks scheduled by using the control information may be, for example, two, three, or four transport blocks. For example, the second state may be 01, 10, or 11.

In an embodiment, the first field includes one or more bits, the first state includes one or more bit states of the first field, and the second state includes one or more bit states of the first field. A quantity of bits included in the first field and each state included in the first field are not limited herein. In an embodiment, the first field in the first information is used to indicate whether the control information is used to schedule one or more transport blocks. Different bit states of the first field are used to indicate whether the control information is used to schedule one or more transport blocks, so that bit overheads of the control information can be reduced, and fewer transmission resources can be occupied.

Further, in an embodiment, the control information is used to schedule a plurality of transport blocks.

HARQ process numbers of the other transport blocks than a first transport block in the plurality of transport blocks are determined based on a HARQ process number of the first transport block; and/or each transport block in the plurality of transport blocks corresponds to one HARQ process number, and the plurality of HARQ process numbers corresponding to the plurality of transport blocks are consecutive.

If the control information is used to schedule a plurality of transport blocks, the first information is used to indicate a HARQ process number of a first transport block, and HARQ process numbers of the other transport blocks than the first transport block in the plurality of transport blocks are determined based on the HARQ process number of the first transport block. For example, the HARQ process numbers of the other transport blocks may be obtained by calculating the HARQ process number of the first transport block in a preset calculation manner. For example, the preset calculation manner may include a plurality of calculation rules, which are described in detail elsewhere in this application. Each transport block in the plurality of transport blocks corresponds to one HARQ process number, that is, one HARQ process number is configured for each transport block, and the plurality of HARQ process numbers corresponding to the plurality of transport blocks are consecutive. When the first information is used to indicate the HARQ process number of the first transport block, the HARQ process numbers of the other transport blocks may be obtained based on that all the HARQ process numbers are consecutive. For example, the HARQ process number of the first transport block is 1. If the control information is used to schedule three transport blocks in total, the HARQ process numbers of the other three transport blocks start from the HARQ process number 1, and are determined as 2, 3, and 4 according to a rule of consecutiveness.

Further, in an embodiment, the HARQ process numbers corresponding to the other transport blocks than the first transport block in the plurality of transport blocks are determined in ascending order based on the HARQ process number corresponding to the first transport block.

Alternatively, a value Rn of a HARQ process number of an $n^{th}$ transport block in the plurality of transport blocks satisfies the following relationship:

$$Rn=\{R1+n-1\} \bmod N.$$

R1 is a value of the HARQ process number of the first transport block, n is a positive integer, mod indicates a modulo operation, and N is a maximum quantity of HARQ processes supported by the control information.

The HARQ process numbers corresponding to the other transport blocks than the first transport block in the plurality of transport blocks may be alternatively determined in descending order based on the HARQ process number corresponding to the first transport block. This is not limited herein. In addition, in an embodiment, the HARQ process number corresponding to each transport block in the plurality of transport blocks may be obtained by using the foregoing modulo operation formula. In an actual application scenario, a manner of obtaining the HARQ process number corresponding to each transport block may be determined with reference to a scenario.

In an embodiment, the first information includes a first field. When a bit state of the first field is a first state, it indicates that the control information is used to schedule one transport block. Alternatively, when a bit state of the first field is a second state, it indicates that the control information is used to schedule a plurality of transport blocks. In this implementation scenario, further, in an embodiment, a value of the HARQ process number of the first transport block may vary with a quantity of transport blocks scheduled by using the control information. The following provides detailed description by using an example.

In an embodiment, when the control information is used to schedule one transport block, the first information indicates the HARQ process number of the first transport block in a value set {0, 1, 2}.

Alternatively, when the control information is used to schedule two transport blocks, the first information indicates the HARQ process number of the first transport block in a value set {0, 1} or {0, 2}.

Alternatively, when the control information is used to schedule three transport blocks, the first information indicates the HARQ process number of the first transport block in a value set {0, 1}.

Alternatively, when the control information is used to schedule four transport blocks, the first information indicates that a value of the HARQ process number of the first transport block is 0.

When the control information is used to schedule one transport block, the first information only needs to indicate the HARQ process number of the first transport block in {0, 1, 2}. For example, the HARQ process number of the first transport block may be 0, 1, or 2. When the control information is used to schedule two transport blocks, the first information only needs to indicate the HARQ process number of the first transport block in the value set {0, 1} or {0, 2}. For example, the HARQ process number of the first transport block may be 0 or 1, or the HARQ process number of the first transport block may be 0 or 2. When the control information is used to schedule three transport blocks, the first information only needs to indicate the HARQ process number of the first transport block in the value set {0, 1}. For example, the HARQ process number of the first transport block may be 0 or 1. When the control information is used to schedule four transport blocks, the first information indicates that the value of the HARQ process number of the first transport block is 0. In this case, HARQ process numbers of all the transport blocks scheduled by using the control information may be, for example, 0, 1, 2, and 3. For details, refer to example content shown in Table 1 and described elsewhere in this application. In the foregoing manner, bit overheads of the control information can be reduced.

In an embodiment, when the control information is used to schedule one transport block, the first information indicates the HARQ process number of the first transport block in a value set {0, 1} or {0, 2}.

Alternatively, when the control information is used to schedule two transport blocks, the first information indicates the HARQ process number of the first transport block in a value set {0, 1, 2}.

Alternatively, when the control information is used to schedule three transport blocks, the first information indicates the HARQ process number of the first transport block in a value set {0, 1}.

Alternatively, when the control information is used to schedule four transport blocks, the first information indicates that a value of the HARQ process number of the first transport block is 0.

When the control information is used to schedule one transport block, the first information only needs to indicate the HARQ process number of the first transport block in the value set {0, 1} or {0, 2}. For example, the HARQ process number of the first transport block may be 0 or 1. For another example, the HARQ process number of the first transport block may be 0 or 2. When the control information is used to schedule two transport blocks, the first information only needs to indicate the HARQ process number of the first transport block in the value set {0, 1, 2}. For example, the HARQ process number of the first transport block may be 0, 1, or 2. When the control information is used to schedule three transport blocks, the first information only needs to indicate the HARQ process number of the first transport block in the value set {0, 1}. For example, the HARQ process number of the first transport block may be 0 or 1. When the control information is used to schedule four transport blocks, the first information indicates that the value of the HARQ process number of the first transport block is 0. In this case, HARQ process numbers of all the transport blocks scheduled by using the control information may be, for example, 0, 1, 2, and 3. In the foregoing manner, bit overheads of the control information can be reduced.

In an embodiment, when the control information is used to schedule one, two, or three transport blocks, the first information indicates the HARQ process number of the first transport block in a value set {0, 1}; and/or when the control information is used to schedule four transport blocks, the first information indicates that a value of the HARQ process number of the first transport block is 0.

When the control information is used to schedule one, two, or three transport blocks, the first information only needs to indicate the HARQ process number of the first transport block in the value set {0, 1}. For example, the HARQ process number of the first transport block may be 0 or 1. When the control information is used to schedule four transport blocks, the first information indicates that the value of the HARQ process number of the first transport block is 0. In this case, HARQ process numbers of all the transport blocks scheduled by using the control information may be, for example, 0, 1, 2, and 3. In the foregoing manner, bit overheads of the control information can be reduced.

In an embodiment, the first information includes a first field, and the first field includes one bit, and is used to indicate the transport block set information.

When a bit state of the first field is 0, it indicates that the control information is used to schedule one transport block. The control information further includes a second field, and the second field indicates a HARQ process number of the transport block.

Alternatively, when a bit state of the first field is 1, it indicates that the control information is used to schedule a plurality of transport blocks. The control information further includes a third field, and the third field indicates a quantity of transport blocks scheduled by using the control information and a HARQ process number corresponding to a first transport block, or is used to determine HARQ process numbers of all the transport blocks scheduled by using the control information.

The first field includes one bit, and is used to indicate the transport block set information. A bit state of the first field may be 0 or 1. When the bit state of the first field is 0, it indicates that the control information is used to schedule one transport block. The control information further includes a second field, and the second field indicates a HARQ process number of the transport block. When the bit state of the first field is 1, it indicates that the control information is used to schedule a plurality of transport blocks. The control information may further include a third field, and the third field indicates a quantity of transport blocks scheduled by using the control information and a HARQ process number corresponding to a first transport block, or is used to determine HARQ process numbers of all the transport blocks scheduled by using the control information. In the foregoing manner, bit overheads of the control information can be reduced.

For another example, when the bit state of the first field is 1, it indicates that the control information is used to schedule a plurality of transport blocks. The first information is higher layer signaling. The first information may include a third field, and the third field indicates a quantity of transport blocks scheduled by using the control information and a HARQ process number corresponding to a first transport block, or is used to determine HARQ process numbers of all the transport blocks scheduled by using the control information. In the foregoing manner, bit overheads of the control information can be reduced.

In an embodiment, the second communications device may indicate, in different implementations, a HARQ process number corresponding to a first transport block in a plurality of transport blocks. This is not limited. For example, in an implementation 1, the second communications device indicates only the HARQ process number corresponding to the first transport block in the plurality of transport blocks, and HARQ process numbers corresponding to the transport blocks (other than the first transport block) in the plurality of transport blocks are determined based on the HARQ process number corresponding to the first transport block in ascending order or according to a modulo operation formula. For example, in an implementation 2, the second communications device indicates HARQ process numbers corresponding to all the transport blocks (including the first transport block) in the plurality of transport blocks. The HARQ process numbers corresponding to the plurality of transport blocks satisfy an ascending order or a modulo operation formula. In this case, the implementation 2 is merely a variant of the implementation 1. In an embodiment, the implementation 1 and the implementation 2 are equivalent, and both are implementations in which the second communications device indicates the HARQ process number corresponding to the first transport block in the plurality of transport blocks.

Further, in an embodiment, when the control information is used to schedule two or four transport blocks, the first information indicates that a value of the HARQ process number of the first transport block is 0, or when the control information is used to schedule three transport blocks, the first information indicates the HARQ process number of the first transport block in a value set $\{0, 1\}$.

Alternatively, when the control information is used to schedule two transport blocks, the first information indicates the HARQ process number of the first transport block in a value set $\{0, 1\}$, or when the control information is used to schedule three or four transport blocks, the first information indicates that a value of the HARQ process number of the first transport block is 0.

When the control information is used to schedule two transport blocks, the first information indicates that the value of the HARQ process number of the first transport block is 0. In this case, a value of a HARQ process number of a second transport block scheduled by using the control information is 1. When the control information is used to schedule four transport blocks, the first information indicates that the value of the HARQ process number of the first transport block is 0. In this case, values of HARQ process numbers of a second transport block, a third transport block, and a fourth transport block scheduled by using the control information are 1, 2, and 3. When the control information is used to schedule three transport blocks, the first information indicates the HARQ process number of the first transport block in the value set $\{0, 1\}$, for example, the first information indicates that the value of the HARQ process number of the first transport block is 0. In this case, values of HARQ process numbers of a second transport block and a third transport block scheduled by using the control information are 1 and 2. The first information indicates that the value of the HARQ process number of the first transport block is 1. In this case, values of HARQ process numbers of a second transport block and a third transport block scheduled by using the control information are 2 and 3. For details, refer to example content shown in Table 2a and Table 2b and described elsewhere in this application. In the foregoing manner, bit overheads of the control information can be reduced.

In an embodiment, the first information includes a first field, and the first field includes one bit.

When a bit state of the first field is 0, the control information is used to schedule a transport block within a first transport block quantity range, and the control information further includes a fourth field, where the fourth field indicates a HARQ process number of a first transport block in a plurality of transport blocks scheduled within the first transport block quantity range; and/or when a bit state of the first field is 1, the control information is used to schedule a transport block within a second transport block quantity range, and the control information further includes a fourth field, where the fourth field indicates a HARQ process number of a first transport block in a plurality of transport blocks scheduled within the second transport block quantity range.

The control information is used to schedule a transport block within a first transport block quantity range or a transport block within a second transport block quantity range. For example, the first transport block quantity range may be $\{1, 3\}$. In this case, the second transport block quantity range is $\{2, 4\}$. The control information further includes a fourth field, or when the first information is higher layer signaling, the first information includes the foregoing fourth field. The fourth field is used to indicate a HARQ process number of a first transport block in a plurality of transport blocks scheduled within the first transport block quantity range, or a HARQ process number of a first transport block in a plurality of transport blocks scheduled within the second transport block quantity range. In the foregoing manner, only the HARQ process number of the first transport block needs to be indicated, and a HARQ process number of another transport block scheduled by using the control information does not need to be indicated, so that bit overheads of the control information can be reduced.

Further, in an embodiment, the first transport block quantity range is $\{1, 3\}$, the control information is used to schedule A transport blocks, the first information indicates the HARQ process number of the first transport block in a value set $\{0, 1\}$, and A is a value in a value set $\{1, 3\}$.

Alternatively, the first transport block quantity range is $\{1, 4\}$, and when the control information is used to schedule one transport block, the first information indicates the HARQ process number of the first transport block in a value set $\{0, 1, 2\}$, or when the control information is used to schedule four transport blocks, the first information indicates that a value of the HARQ process number of the first transport block is 0.

That the first transport block quantity range is $\{1, 3\}$ indicates that a quantity of transport blocks scheduled by using the control information can only be a value in $\{1, 3\}$, and the first information may indicate that the HARQ process number of the first transport block is 0 or 1. Alternatively, the first transport block quantity range is $\{1, 4\}$, and when the control information is used to schedule one transport block, the first information indicates that the HARQ process number of the first transport block is 0, 1, or 2. When the control information is used to schedule four transport blocks, the first information indicates that the value of the HARQ process number of the first transport block is 0. In this case, HARQ process numbers of the other three transport blocks scheduled by using the control information are 0, 1, and 2. In the foregoing manner, only the HARQ process number of the first transport block needs to be indicated, and a HARQ process number of another transport block scheduled by using the control information does not need to be indicated, so that bit overheads of the control information can be reduced.

In an embodiment, the first transport block quantity range may be {1, 3}. In this case, the second transport block quantity range is {2, 4}. The first transport block quantity range may be {1, 4}. In this case, the second transport block quantity range is {2, 3}. The following describes the second transport block quantity range, and the HARQ process number of the first transport block that is indicated by the first information.

The second transport block quantity range is {2, 4}, and when the control information is used to schedule two transport blocks, the first information indicates the HARQ process number of the first transport block in a value set {0, 1, 2}, or when the control information is used to schedule four transport blocks, the first information indicates that a value of the HARQ process number of the first transport block is 0.

Alternatively, the second transport block quantity range is {2, 3}, and when the control information is used to schedule two transport blocks, the first information indicates the HARQ process number of the first transport block in a value set {0, 1} or {0, 2}, or when the control information is used to schedule three transport blocks, the first information indicates the HARQ process number of the first transport block in a value set {0, 1}.

For details about a value of the second transport block quantity range, and the HARQ process number of the first transport block that is indicated by the first information, refer to the foregoing example. In the foregoing manner, only the HARQ process number of the first transport block needs to be indicated, and a HARQ process number of another transport block scheduled by using the control information does not need to be indicated, so that bit overheads of the control information can be reduced.

In an embodiment, the transport block information indicates a quantity of transport blocks scheduled by using the control information, and the transport block information includes two bits.

When a bit state of the transport block information is 00, it indicates that the control information is used to schedule one transport block.

Alternatively, when a bit state of the transport block information is any one of bit states 01 to 11, it indicates that the control information is used to schedule a plurality of transport blocks.

In an embodiment, a HARQ process number of a first transport block in one or more transport blocks scheduled by using the control information is 0, a preset value, or a configured value, and a plurality of HARQ process numbers corresponding to the plurality of transport blocks are consecutive.

The transport block information may be used to indicate a quantity of transport blocks scheduled by using the control information. For example, the transport block information includes two bits. A HARQ process number of a first transport block in one or more transport blocks scheduled by using the control information is 0, and a plurality of HARQ process numbers corresponding to the plurality of transport blocks are consecutive. In this case, none of the HARQ process numbers of the transport blocks needs to be indicated, because the HARQ process number of the first transport block is always 0. In this case, HARQ process numbers of the other transport blocks may be obtained in sequence. For details, refer to example content shown in Table 3 and described elsewhere in this application. In the foregoing manner, because there is no need to indicate the HARQ process number of the transport block, bit overheads of the control information can be reduced.

In an embodiment, the higher layer signaling is radio resource control signaling, and the radio resource control signaling includes the first information.

When the first information includes the transport block information, and the transport block information indicates only a HARQ process number of a first transport block in transport blocks scheduled by using the control information, the control information indicates a quantity of transport blocks scheduled by using the control information.

Alternatively, when the first information includes the maximum transport block quantity information and/or the first combination set, the control information indicates a quantity of transport blocks scheduled by using the control information and a HARQ process number of a first transport block in the transport blocks scheduled by using the control information, or indicates HARQ process numbers of all the transport blocks scheduled by using the control information.

The first information includes the transport block information. If the transport block information indicates only a HARQ process number of a first transport block in transport blocks scheduled by using the control information, the control information indicates a quantity of transport blocks scheduled by using the control information. Therefore, the HARQ process number of the first transport block and the quantity of transport blocks scheduled by using the control information may be determined by using the transport block information and the control information. In another implementation scenario, the first information is higher layer signaling, and when the first information includes the maximum transport block quantity information and/or the first combination set, the control information may indicate a quantity of transport blocks scheduled by using the control information and a HARQ process number of a first transport block in the transport blocks scheduled by using the control information, or indicates HARQ process numbers of all the transport blocks scheduled by using the control information. Whether the control information indicates the HARQ process number of the first transport block or the HARQ process numbers of all the transport blocks depends on an application scenario. This is not limited herein.

Further, in an embodiment, when the first information includes the transport block information, the method further includes: The first communications device receives HARQ process number set information sent by the second communications device, where the HARQ process number set information indicates at least one HARQ process number set.

The second communications device may further send HARQ process number set information to the first communications device, so that the first communications device can determine at least one HARQ process number set based on the HARQ process number set information. The second communications device may send the HARQ process number set information to the first communications device, so that the second communications device further sends the control information to the first communications device. The control information indicates a HARQ number and/or a quantity of transport blocks in the HARQ process number set determined by the second communications device. Therefore, indication overheads of the control information can be reduced.

In an embodiment, a value of the maximum quantity of transport blocks is a value in a value set {2, 4} or a value in a value set {1, 2, 4}. In an embodiment, the second communications device may limit the maximum quantity of transport blocks scheduled by using the control information, so that the control information only needs to indicate a maximum quantity of transport blocks in the value set {2, 4} or the value set {1, 2, 4}, and does not need to indicate all the transport blocks. Therefore, indication overheads of the control information can be reduced.

In an embodiment, all the transport blocks scheduled by using the control information are initially transmitted transport blocks or retransmitted transport blocks.

That all the transport blocks are initially transmitted transport blocks means that transmission manners of all the transport blocks scheduled by using the control information are initial transmission, and that all the transport blocks are retransmitted transport blocks means that transmission manners of all the transport blocks scheduled by using the control information are retransmission. For example, in the control information, one bit may be used to indicate whether all the transport blocks are initially transmitted transport blocks or retransmitted transport blocks, so that the communications device determines, by parsing the control information, whether to initially transmit or retransmit all the transport blocks.

It can be learned from the foregoing example description of that, to enable the first communications device to obtain a quantity of transport blocks and a HARQ process number corresponding to each transport block that are determined by the second communications device, the second communications device may generate one piece of first information, and send the first information to the first communications device. Therefore, the first communications device can obtain, based on the received first information, the quantity of transport blocks and the HARQ process number corresponding to each transport block that are determined by the second communications device. To reduce indication overheads of control information, in an embodiment, the first information generated by the second communications device may be used to indicate one or more of the following information: transport block set information, maximum transport block quantity information, transport block information, or first combination set information. In an embodiment, a HARQ process number corresponding to each transport block scheduled by using downlink information can be limited, so that bit overheads of the control information can be reduced, and transmission performance of the control information can be improved.

To better understand and implement the foregoing solutions in an embodiment, the following uses a corresponding application scenario as an example for a description.

In an embodiment, an example in which the first communications device is UE and the second communications device is a base station is used for description. The foregoing control information is subsequently described by using CI as an example. In an embodiment, when the CI is used to schedule a plurality of transport blocks, CI indication overheads can be reduced, and resource efficiency can be improved.

In an embodiment, flexibility of a HARQ process number is less important than flexibility of a TB quantity for indication, that is, flexible scheduling of the TB quantity is preferentially ensured in an embodiment. Therefore, a HARQ process number corresponding to each TB scheduled by using the CI is limited, so that CI bit overheads are reduced, and CI transmission performance is improved.

In an embodiment, only two to three bits are used to indicate the scheduled TB and the scheduled HARQ process.

In an embodiment, the second communications device sends the first information to the first communications device. The second communications device may be a base station, or a device that has a sending capability. The first communications device may be user equipment, or a device that has a receiving capability. The first information may be included in higher layer (for example, RRC or media access control) signaling or physical layer signaling.

The first information may be included in higher layer (for example, RRC or media access control) signaling or physical layer signaling. A definition of the first information is described above, and details are not described herein again.

In an embodiment, HARQ process numbers corresponding to different TBs in a plurality of TBs scheduled by using the CI are the same.

In an embodiment, the first information indicates a HARQ process number of a first TB, and HARQ process numbers corresponding to the other TBs are obtained based on the HARQ process number of the first TB.

In an embodiment, the first information indicates transport block set information, that is, indicates a set of quantities of TBs that can be scheduled by using the CI. Alternatively, the first information indicates a maximum quantity of TBs that can be scheduled. In an embodiment, the transport block set information indicates whether the CI may be used for scheduling in a first quantity of transport blocks or a second quantity of transport blocks. The first information may be information carried in the CI, or may be notified by the base station to the user equipment by using higher layer signaling (for example, radio resource control signaling or media access control signaling). The first information may include one or more bits, or one or more states of one field.

The first quantity may be a value, or may be a set including a plurality of values, or may be a value range. The first quantity may be specified in advance, or may be configured or indicated by the base station. For example, the first quantity is a value configured or indicated by the base station, or a set of values configured or indicated by the base station, or a value range specified in advance.

The second quantity may be a value, or may be a set including a plurality of values, or may be a value range. The second quantity may be specified in advance, or may be configured or indicated by the base station. For example, the second quantity is a value configured or indicated by the base station, or a set of values configured or indicated by the base station, or a value range specified in advance.

For example, the first quantity is 1, and the second quantity is N, where $1<N \leq M$, and M is an integer specified in advance.

For example, the first quantity is a set of values, that is, {1, 2}, and the second quantity is a set of values, that is, {3, 4}.

For example, a size of the first information is one bit. When a bit state of the first information is 0, the CI indicates that the CI is used to schedule one transport block. Alternatively, when a bit state of the first information is 1, the CI indicates that the CI is used to schedule two to four transport blocks.

For example, the first information is a bit state of a first field. When a bit state of the first information is a first state of the first field, the CI indicates that the CI is used to schedule one transport block. Alternatively, when a bit state of the first information is a second state of the first field, the CI indicates that the CI is used to schedule two to four transport blocks.

When the first information indicates that the CI is used to schedule the second quantity of transport blocks, each of the second quantity of transport blocks corresponds to one HARQ process number. HARQ process numbers corresponding to different transport blocks may be different. In an embodiment, HARQ process numbers corresponding to different transport blocks may alternatively be the same.

For example, the second quantity is a value in 2 to 4. HARQ process numbers corresponding to all of the second quantity of transport blocks are different, and HARQ process numbers corresponding to the second quantity of transport blocks are consecutive.

For example, when the first information indicates that the CI is used to schedule the second quantity of transport blocks, it is assumed that four HARQ processes can be indicated.

For example, when the second quantity is 2, a set of HARQ process numbers corresponding to the two transport blocks is $\{n_0, n_1\}$.

For example, when the second quantity is 3, a set of HARQ process numbers corresponding to the three transport blocks is $\{n_0, n_1, n_2\}$ or $\{n_1, n_2, n_3\}$.

For example, when the second quantity is 4, a set of HARQ process numbers corresponding to the four transport blocks is $\{n_0, n_1, n_2, n_3\}$.

Herein, $n_0$, $n_1$, $n_2$, and $n_3$ are four HARQ process numbers. Values of $n_0$, $n_1$, $n_2$, and $n_3$ may be fixed, for example, $n_0=0$, $n_1=1$, $n_2=2$, and $n_3=3$.

In an embodiment, a HARQ process number $n_i$ corresponding to a first transport block in the second quantity of transport blocks is indicated by the base station, and HARQ process numbers corresponding to the other transport blocks in the second quantity of transport blocks are determined in ascending (or descending) order based on $n_i$.

Table 1 shows an example of a CI indication method.

When a state of the first information is a first bit state, the CI is used to schedule one TB, and a HARQ process corresponding to the TB is indicated by the base station. For example, one bit is used to indicate the HARQ process number corresponding to the TB from two numbers. Alternatively, when a state of the first information is a second bit state, the CI is used to schedule two to four TBs.

The CI indicates a quantity of scheduled TBs and a HARQ process number corresponding to each TB. As shown in Table 1, when the quantity of TBs is 2 to 4, there are four combinations in total for each quantity of TBs and a HARQ process corresponding to each TB. Therefore, when the indicated quantity of TBs is 2 to 4, two bits may be used to indicate a quantity of TBs scheduled by using the CI and a HARQ process number corresponding to the scheduled TB.

TABLE 1

The CI indicates a quantity of scheduled TBs and a HARQ process number

| Quantity of scheduled TBs | State of the first information | HARQ process number corresponding to the TB scheduled by using the CI |
|---|---|---|
| 1 | The state of the first information is a first bit state | {0} or {1} |
| 2 | The state of the first information is a second bit state | {0, 1} |
| 3 | | {0, 1, 2} or {1, 2, 3} |
| 4 | | {0, 1, 2, 3} |

Table 2a and Table 2b show an example in which when the CI is used to schedule two to four TBs, two bits are used to indicate a quantity of TBs scheduled by using the CI and a HARQ process number corresponding to the scheduled TB. In an embodiment, the CI indicates only a HARQ process number of a first TB in a plurality of TBs (as shown in the third column of Table 2a and Table 2b). In an embodiment, the CI indicates a HARQ process number of each of a plurality of TBs (as shown in the fourth column of Table 2a and Table 2b).

When the CI indicates only the HARQ process number of the first TB in the plurality of TBs, HARQ process numbers that are of the other TBs in the plurality of TBs and that are indicated by the CI are obtained in ascending (or descending) order based on the HARQ process number of the first TB. For example, if the CI indicates that two TBs are scheduled, and a HARQ process number of a first TB is m, a HARQ process number of a second TB is m+1.

TABLE 2a

The CI indicates a plurality of scheduled TBs and a HARQ process number corresponding to each TB

| Bit state | Quantity of scheduled TBs | HARQ process number corresponding to a first TB scheduled by using the CI | HARQ process number corresponding to the TB scheduled by using the CI |
|---|---|---|---|
| 00 | 2 | 0 | {0, 1} |
| 01 | 3 | 0 | {0, 1, 2} |
| 10 | 3 | 1 | {1, 2, 3} |
| 11 | 4 | 0 | {0, 1, 2, 3} |

TABLE 2b

The CI indicates a plurality of scheduled TBs and a HARQ process number corresponding to each TB

| Bit state | Quantity of scheduled TBs | HARQ process number corresponding to a first TB scheduled by using the CI | HARQ process number corresponding to the TB scheduled by using the CI |
|---|---|---|---|
| 00 | 2 | 0 | {0, 1} |
| 01 | 2 | 1 | {1, 2} |
| 10 | 3 | 0 | {0, 1, 2} |
| 11 | 4 | 0 | {0, 1, 2, 3} |

Table 3 shows an example of another CI indication method.

When a bit state of the first information is a first bit state, the CI is used to schedule one TB, and a HARQ process corresponding to the TB is fixed (for example, 0). Alternatively, when a bit state of the first information is a second bit state of the first field, the CI is used to schedule a plurality of TBs, and a HARQ process corresponding to a first TB in the plurality of TBs is fixed. HARQ process numbers that are of the other TBs in the plurality of TBs and that are indicated by the CI are obtained in ascending (or descending) order based on the HARQ process number of the first TB. For example, the HARQ process corresponding to the first TB is always 0.

TABLE 3

The CI indicates a plurality of scheduled TBs and a HARQ process number corresponding to each TB

| Bit state | Quantity of scheduled TBs | HARQ process number corresponding to a first TB scheduled by using the CI | HARQ process number corresponding to the TB scheduled by using the CI |
|---|---|---|---|
| 00 | 1 | 0 | {0} |
| 01 | 2 | 0 | {0, 1} |
| 10 | 3 | 0 | {0, 1, 2} |
| 11 | 4 | 0 | {0, 1, 2, 3} |

Table 4 shows an example of another CI indication method.

When a bit state of the first information is a first bit state of the first field, the CI is used to schedule one TB. Alternatively, when a bit state of the first information is a second bit state of the first field, the CI is used to schedule a plurality of TBs, and indicates a HARQ process number corresponding to a first TB in the plurality of TBs. HARQ process numbers that are of the other TBs in the plurality of TBs and that are indicated by the CI are obtained in ascending (or descending) order based on the HARQ process number of the first TB.

TABLE 4

The CI indicates a quantity of scheduled TBs and a HARQ process number

| Bit state of the first information | Quantity of TBs scheduled by using the CI | HARQ process number corresponding to a first TB scheduled by using the CI | Set of HARQ process numbers of all the TBs scheduled by using the CI |
|---|---|---|---|
| First bit state of the first field | 000 | 1 | 0 | {0} |
| | 001 | 1 | 1 | {1} |

TABLE 4-continued

The CI indicates a quantity of scheduled TBs and a HARQ process number

| Bit state of the first information | Quantity of TBs scheduled by using the CI | HARQ process number corresponding to a first TB scheduled by using the CI | Set of HARQ process numbers of all the TBs scheduled by using the CI |
|---|---|---|---|
| Second bit state of the first field | 010 | 2 | 0 | {0, 1} |
| | 011 | 2 | 1 | {1, 2} |
| | 100 | 2 | 2 | {2, 3} |
| | 101 | 3 | 0 | {0, 1, 2} |
| | 110 | 3 | 1 | {1, 2, 3} |
| | 111 | 4 | 0 | {0, 1, 2, 3} |

Table 5 shows an example of another CI indication method.

When a bit state of the first information is a first bit state of the first field, the CI is used to schedule one TB, and the CI indicates a HARQ process number corresponding to the TB. Alternatively, when a bit state of the first information is a second bit state of the first field, the CI is used to schedule a plurality of TBs, the CI indicates that the plurality of TBs are all initially transmitted TBs or retransmitted TBs, and the CI indicates a HARQ process number corresponding to a first TB in the plurality of TBs (as shown in the third column of Table 5), or HARQ process numbers corresponding to all the TBs (as shown in the fourth column of Table 5). Alternatively, when a bit state of the first information is a third bit state of the first field, the CI indicates that a plurality of TBs scheduled by using the CI include both an initially transmitted TB and a retransmitted TB.

TABLE 5

The CI indicates a quantity of scheduled TBs and a HARQ process number

| Bit state of the first information | Quantity of TBs scheduled by using the CI | HARQ process number corresponding to a first TB scheduled by using the CI | Set of HARQ process numbers of all the TBs scheduled by using the CI |
|---|---|---|---|
| First bit state of the first field | 000 | 1 | 0 | {0} |
| | 001 | 1 | 1 | {1} |
| Second bit state of the first field | 010 | 2 | 0 | {0, 1} |
| | 011 | 2 | 1 | {1, 2} |
| | 100 | 3 | 0 | {0, 1, 2} |
| | 101 | 3 | 1 | {1, 2, 3} |
| | 110 | 4 | 0 | {0, 1, 2, 3} |
| Third bit state of the first field | 111 | It indicates that a plurality of TBs scheduled by using the CI include both an initially transmitted TB and a retransmitted TB | | |

In an embodiment, the CI may further include one bit, and is used to indicate whether TBs scheduled by using the CI are all initially transmitted TBs or retransmitted TBs.

In an embodiment, the methods and/or systems described throughout this application may be applied to a scenario in which the user equipment works in a coverage enhancement mode B, a coverage enhancement level 2, or a coverage enhancement level 3.

In an embodiment, for example, one bit or two bits in RRC signaling are used as the first information. The first information indicates a set of quantities of TBs that can be scheduled by using the CI. For example, one bit indicates that the set of quantities of TBs is {1, 2} or {3, 4}. Alternatively, the first information indicates a maximum quantity of TBs that can be scheduled by using the DCI. For example, the first information indicates that the maximum quantity of TBs is 2 or 4. For another example, the first information indicates that the maximum quantity of TBs is 1, 2, or 4.

As shown in FIG. 4a, when the first information indicates the set of quantities of TBs {1, 2} (or indicates that the maximum quantity of TBs is 2), one bit in the RRC is further used to indicate one set from two sets to serve as the first set. Two bits in the CI are used to indicate one combination in the first set. The UE determines, according to the indication of the CI, a quantity of TBs scheduled by using the CI (that is, L in FIG. 4a) and a HARQ process number corresponding to a first TB (that is, a first HARQ process number in FIG. 4a). HARQ process numbers corresponding to the other TBs are obtained in ascending order based on the HARQ process number of the first TB.

As shown in FIG. 4b, two bits in the first information are used to indicate one set. Each set includes four combinations. Two bits in the first information are used to indicate one set from three sets to serve as the first set. Two bits in the CI are used to indicate one combination in the first set. The UE determines, according to the indication of the CI, a quantity of TBs scheduled by using the CI (that is, L in FIG. 4b) and a HARQ process number corresponding to a first TB. HARQ process numbers corresponding to the other TBs are obtained in ascending order based on the HARQ process number of the first TB.

For example, the first information indicates a quantity of TBs that can be scheduled by using the CI, or a maximum quantity of TBs that can be scheduled by using the CI.

For example, one bit in the first information is used to indicate that the maximum quantity of scheduled TBs is 2 or 4. When the first information indicates that the maximum quantity of scheduled TBs is 2, the quantity of TBs that can be scheduled by using the CI is 1 or 2. Alternatively, when the first information indicates that the maximum quantity of scheduled TBs is 4, the quantity of TBs that can be scheduled by using the CI is 3 or 4.

For another example, one bit in the first information is used to indicate that the quantity of TBs that can be scheduled by using the CI is {1, 2} or {3, 4}.

As shown in FIG. 4c, when the CI indicates that the quantity of scheduled TBs is 1 or 2, two bits in the first information are further used to indicate a HARQ process number corresponding to a first TB scheduled by using the CI (0 to 3 in FIG. 4c). Alternatively, when the CI indicates that the quantity of scheduled TBs is 3 or 4, a HARQ process number corresponding to a first TB scheduled by using the CI is always 0.

In an embodiment, the first information indicates a quantity of TBs that can be scheduled by using the CI, or a maximum quantity of TBs that can be scheduled by using the CI.

For example, one bit in the first information is used to indicate that the maximum quantity of scheduled TBs is 2 or 4. When the first information indicates that the maximum quantity of scheduled TBs is 2, the quantity of TBs that can be scheduled by using the CI is 1 or 2. Alternatively, when the first information indicates that the maximum quantity of scheduled TBs is 4, the quantity of TBs that can be scheduled by using the CI is 3 or 4.

For another example, one bit in the first information is used to indicate that the quantity of TBs that can be scheduled by using the CI is {1, 2} or {3, 4}.

As shown in FIG. 4d, when the CI indicates that the quantity of scheduled TBs is 1 or 2, one bit in the first information is further used to indicate a quantity of TBs scheduled by using the CI and a HARQ process number corresponding to a first TB scheduled by using the CI. When the DCI indicates that the quantity of scheduled TBs is 3 or 4, a HARQ process number corresponding to a first TB scheduled by using the CI is always 0.

In an embodiment, the CI may further include one bit, and is used to indicate whether TBs scheduled by using the CI are all initially transmitted TBs or retransmitted TBs.

In an embodiment, flexibility of a HARQ process number is less important than flexibility of a TB quantity for indication. Therefore, a HARQ process corresponding to each TB scheduled by using the CI is limited, so that CI bit overheads are reduced, and CI transmission performance is improved. In the conventional technology, four bits are used to indicate a quantity of scheduled TBs and a HARQ process number. In an embodiment, only two to three bits are used to indicate the scheduled TB and the scheduled HARQ process.

It should be noted that, for brief description, the foregoing methods are represented as a series of actions. However, a person skilled in the art should appreciate that this application is not limited to the described order of the operations, because according to this application, some operations may be performed in another order or simultaneously. It should be further appreciated by persons skilled in the art that embodiments described in this specification may include different and/or fewer operations and/or modules.

In an embodiment, the following further provides a related apparatus for implementing the foregoing solutions.

Figure 5:
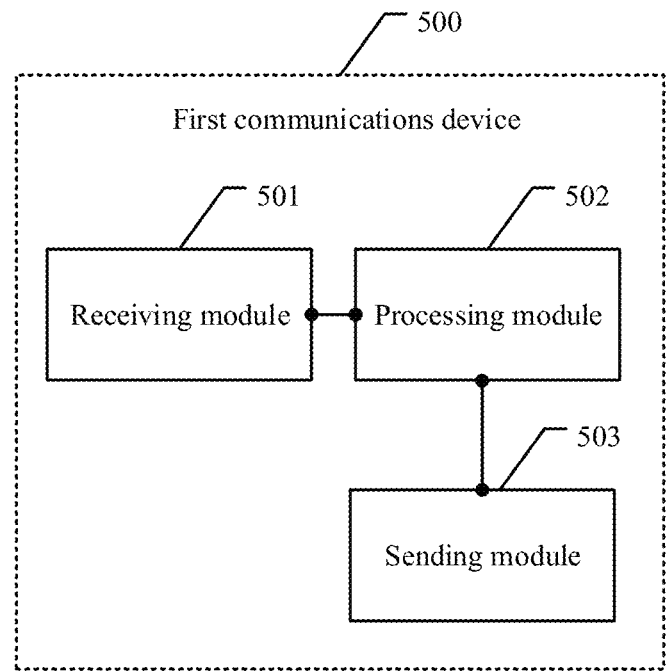
FIG. 5 is a schematic structural diagram of a first communications device according to an embodiment.

FIG. 5 is a schematic structural diagram of a first communications device according to an embodiment. The first communications device 500 includes:

a receiving module 501, configured to receive first information sent by a second communications device, where the first information is used to indicate one or more of transport block set information, maximum transport block quantity information, transport block information, or first combination set information; the transport block set information indicates a transport block quantity range and/or a transport block quantity set; the maximum transport block quantity information indicates a maximum quantity of transport blocks that can be scheduled by using control information; the transport block information indicates a quantity of transport blocks scheduled by using the control information, and/or a hybrid automatic repeat request HARQ process number of a first transport block in the transport blocks scheduled by using the control information, and/or HARQ process numbers of all the transport blocks scheduled by using the control information; and each combination in a first combination set is used to determine a quantity of transport blocks scheduled by using the control information and a HARQ process number of a first transport block in the transport blocks scheduled by using the control information, or is used to determine HARQ process numbers of all the transport blocks scheduled by using the control information;

a processing module 502, configured to determine, based on the first information, a quantity of transport blocks scheduled by using the control information, and a HARQ process number corresponding to each transport block in the transport blocks scheduled by using the control information; and a sending module 503, configured to send data to the second communications device based on the determined quantity of transport blocks and the determined HARQ process number corresponding to each transport block, where the receiving module 501 is further configured to receive, based on the determined quantity of transport blocks and the determined HARQ process number corresponding to each transport block, data sent by the second communications device.

In an embodiment, the receiving module 501 is configured to: receive higher layer signaling sent by the second communications device, where the higher layer signaling includes the first information; or receive control information sent by the second communications device, where the control information includes the first information.

Figure 6:
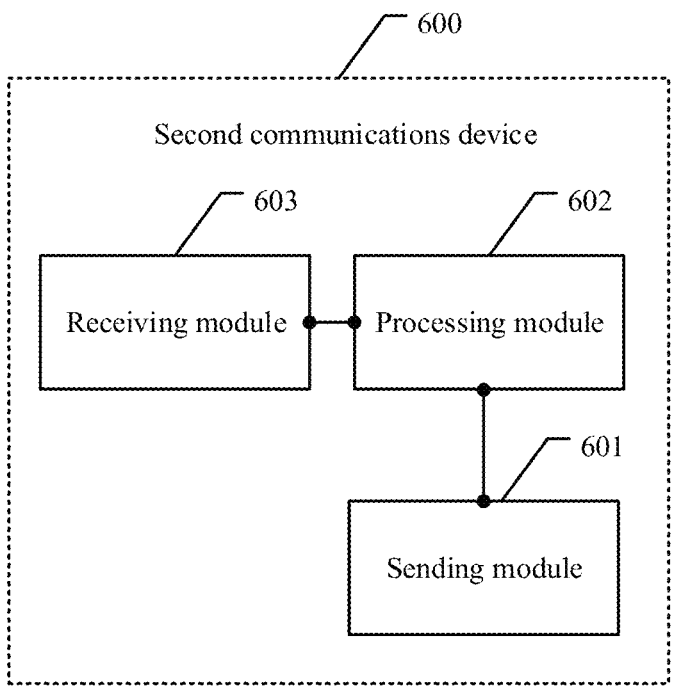
FIG. 6 is a schematic structural diagram of a second communications device according to an embodiment.

FIG. 6 is a schematic structural diagram of a second communications device according to an embodiment. The second communications device 600 includes:

a processing module 602, configured to determine a quantity of transport blocks scheduled by using control information, and a hybrid automatic repeat request HARQ process number corresponding to each transport block in the transport blocks scheduled by using the control information, where the processing module 602 is further configured to generate first information;

a sending module 601, configured to send the first information to a first communications device, where the first information is used to indicate one or more of transport block set information, maximum transport block quantity information, transport block information, or first combination set information; the transport block set information indicates a transport block quantity range and/or a transport block quantity set; the maximum transport block quantity information indicates a maximum quantity of transport blocks that can be scheduled by using the control information; the transport block information indicates a quantity of transport blocks scheduled by using the control information, and/or a hybrid automatic repeat request HARQ process number of a first transport block in the transport blocks scheduled by using the control information, and/or HARQ process numbers of all the transport blocks scheduled by using the control information; and each combination in a first combination set is used to determine a quantity of transport blocks scheduled by using the control information and a HARQ process number of a first transport block in the transport blocks scheduled by using the control information, or is used to determine HARQ process numbers of all the transport blocks scheduled by using the control information; and the sending module 601 is further configured to send data to the first communications device based on the determined quantity of transport blocks and the determined HARQ process number corresponding to each transport block; and a receiving module 603, configured to receive, based on the determined quantity of transport blocks and the determined HARQ process number corresponding to each transport block, data sent by the first communications device.

In an embodiment, the sending module 601 is configured to: send higher layer signaling to the first communications device, where the higher layer signaling includes the first information; or send control information to the first communications device, where the control information includes the first information.

In an embodiment, the first information includes a first field.

When a bit state of the first field is a first state, it indicates that the control information is used to schedule one transport block.

Alternatively, when a bit state of the first field is a second state, it indicates that the control information is used to schedule a plurality of transport blocks.

The first field includes one or more bits, the first state includes one or more bit states of the first field, and the second state includes one or more bit states of the first field.

In an embodiment, the control information is used to schedule a plurality of transport blocks.

HARQ process numbers of the other transport blocks than a first transport block in the plurality of transport blocks are determined based on a HARQ process number of the first transport block; and/or each transport block in the plurality of transport blocks corresponds to one HARQ process number, and the plurality of HARQ process numbers corresponding to the plurality of transport blocks are consecutive.

In an embodiment, the HARQ process numbers corresponding to the other transport blocks than the first transport block in the plurality of transport blocks are determined in ascending order based on the HARQ process number corresponding to the first transport block.

Alternatively, a value Rn of a HARQ process number of an $n^{th}$ transport block in the plurality of transport blocks satisfies the following relationship:

$$Rn = \{R1+n-1\} \bmod N.$$

R1 is a value of the HARQ process number of the first transport block, n is a positive integer, mod indicates a modulo operation, and N is a maximum quantity of HARQ processes supported by the control information.

In an embodiment, when the control information is used to schedule one transport block, the first information indicates the HARQ process number of the first transport block in a value set {0, 1, 2}.

Alternatively, when the control information is used to schedule two transport blocks, the first information indicates the HARQ process number of the first transport block in a value set {0, 1} or {0, 2}.

Alternatively, when the control information is used to schedule three transport blocks, the first information indicates the HARQ process number of the first transport block in a value set {0, 1}.

Alternatively, when the control information is used to schedule four transport blocks, the first information indicates that a value of the HARQ process number of the first transport block is 0.

In an embodiment, when the control information is used to schedule one transport block, the first information indicates the HARQ process number of the first transport block in a value set {0, 1} or {0, 2}.

Alternatively, when the control information is used to schedule two transport blocks, the first information indicates the HARQ process number of the first transport block in a value set {0, 1, 2}.

Alternatively, when the control information is used to schedule three transport blocks, the first information indicates the HARQ process number of the first transport block in a value set {0, 1}.

Alternatively, when the control information is used to schedule four transport blocks, the first information indicates that a value of the HARQ process number of the first transport block is 0.

In an embodiment, when the control information is used to schedule one, two, or three transport blocks, the first information indicates the HARQ process number of the first transport block in a value set {0, 1}; and/or when the control information is used to schedule four transport blocks, the first information indicates that a value of the HARQ process number of the first transport block is 0.

In an embodiment, the first information includes a first field, and the first field includes one bit, and is used to indicate the transport block set information.

When a bit state of the first field is 0, it indicates that the control information is used to schedule one transport block. The control information further includes a second field, and the second field indicates a HARQ process number of the transport block.

Alternatively, when a bit state of the first field is 1, it indicates that the control information is used to schedule a plurality of transport blocks. The control information further includes a third field, and the third field indicates a quantity of transport blocks scheduled by using the control information and a HARQ process number corresponding to a first transport block, or is used to determine HARQ process numbers of all the transport blocks scheduled by using the control information.

In an embodiment, when the control information is used to schedule two or four transport blocks, the first information indicates that a value of the HARQ process number of the first transport block is 0, or when the control information is used to schedule three transport blocks, the first information indicates the HARQ process number of the first transport block in a value set 10, 11.

Alternatively, when the control information is used to schedule two transport blocks, the first information indicates the HARQ process number of the first transport block in a value set {0, 1}, or when the control information is used to schedule three or four transport blocks, the first information indicates that a value of the HARQ process number of the first transport block is 0.

In an embodiment, the first information includes a first field, and the first field includes one bit.

When a bit state of the first field is 0, the control information is used to schedule a transport block within a first transport block quantity range, and the control information further includes a fourth field, where the fourth field indicates a HARQ process number of a first transport block in a plurality of transport blocks scheduled within the first transport block quantity range; and/or when a bit state of the first field is 1, the control information is used to schedule a transport block within a second transport block quantity range, and the control information further includes a fourth field, where the fourth field indicates a HARQ process number of a first transport block in a plurality of transport blocks scheduled within the second transport block quantity range.

In an embodiment, the first transport block quantity range is {1, 3}, the control information is used to schedule A transport blocks, the first information indicates the HARQ process number of the first transport block in a value set {0, 1}, and A is a value in a value set {1, 3}.

Alternatively, the first transport block quantity range is {1, 4}, and when the control information is used to schedule one transport block, the first information indicates the HARQ process number of the first transport block in a value set {0, 1, 2}, or when the control information is used to schedule four transport blocks, the first information indicates that a value of the HARQ process number of the first transport block is 0.

In an embodiment, the second transport block quantity range is {2, 4}, and when the control information is used to schedule two transport blocks, the first information indicates the HARQ process number of the first transport block in a value set {0, 1, 2}, or when the control information is used to schedule four transport blocks, the first information indicates that a value of the HARQ process number of the first transport block is 0.

Alternatively, the second transport block quantity range is {2, 3}, and when the control information is used to schedule two transport blocks, the first information indicates the HARQ process number of the first transport block in a value set {0, 1} or {0, 2}, or when the control information is used to schedule three transport blocks, the first information indicates the HARQ process number of the first transport block in a value set {0, 1}.

In an embodiment, the transport block information indicates a quantity of transport blocks scheduled by using the control information, and the transport block information includes two bits.

When a bit state of the transport block information is 00, it indicates that the control information is used to schedule one transport block.

Alternatively, when a bit state of the transport block information is any one of bit states 01 to 11, it indicates that the control information is used to schedule a plurality of transport blocks.

A HARQ process number of a first transport block in one or more transport blocks scheduled by using the control information is 0, and a plurality of HARQ process numbers corresponding to the plurality of transport blocks are consecutive.

In an embodiment, the higher layer signaling is radio resource control signaling, and the radio resource control signaling includes the first information.

When the first information includes the transport block information, and the transport block information indicates only a HARQ process number of a first transport block in transport blocks scheduled by using the control information, the control information indicates a quantity of transport blocks scheduled by using the control information.

Alternatively, when the first information includes the maximum transport block quantity information and/or the first combination set, the control information indicates a quantity of transport blocks scheduled by using the control information and a HARQ process number of a first transport block in the transport blocks scheduled by using the control information, or indicates HARQ process numbers of all the transport blocks scheduled by using the control information.

In an embodiment, when the first information includes the transport block information, the method further includes: The first communications device receives HARQ process number set information sent by the second communications device, where the HARQ process number set information indicates at least one HARQ process number set.

In an embodiment, a value of the maximum quantity of transport blocks is a value in a value set {2, 4} or a value in a value set {1, 2, 4}.

In an embodiment, all the transport blocks scheduled by using the control information are initially transmitted transport blocks or retransmitted transport blocks.

In an embodiment, the first communications device works in a coverage enhancement mode B, a coverage enhancement level 2, or a coverage enhancement level 3.

It can be learned from the foregoing example description that, to enable the first communications device to obtain a quantity of transport blocks and a HARQ process number corresponding to each transport block that are determined by the second communications device, the second communications device may generate one piece of first information, and send the first information to the first communications device. Therefore, the first communications device can obtain, based on the received first information, the quantity of transport blocks and the HARQ process number corresponding to each transport block that are determined by the second communications device. To reduce indication overheads of control information, in an embodiment, the first information generated by the second communications device may be used to indicate one or more of the following information: transport block set information, maximum transport block quantity information, transport block information, or first combination set information. In an embodiment, a HARQ process number corresponding to each transport block scheduled by using downlink information can be limited, so that bit overheads of the control information can be reduced, and transmission performance of the control information can be improved.

It should be noted that content such as information exchange between the modules/units of the apparatus and the execution processes thereof is based on the same idea as the methods described herein, and produces the same technical effects as the methods described herein. For the content, refer to the foregoing descriptions in the methods described herein. Details are not described herein again.

In an embodiment, a computer storage medium is provided. The computer storage medium stores a program. The program is executed to perform some or all of the operations described in the methods disclosed herein.

Figure 7:
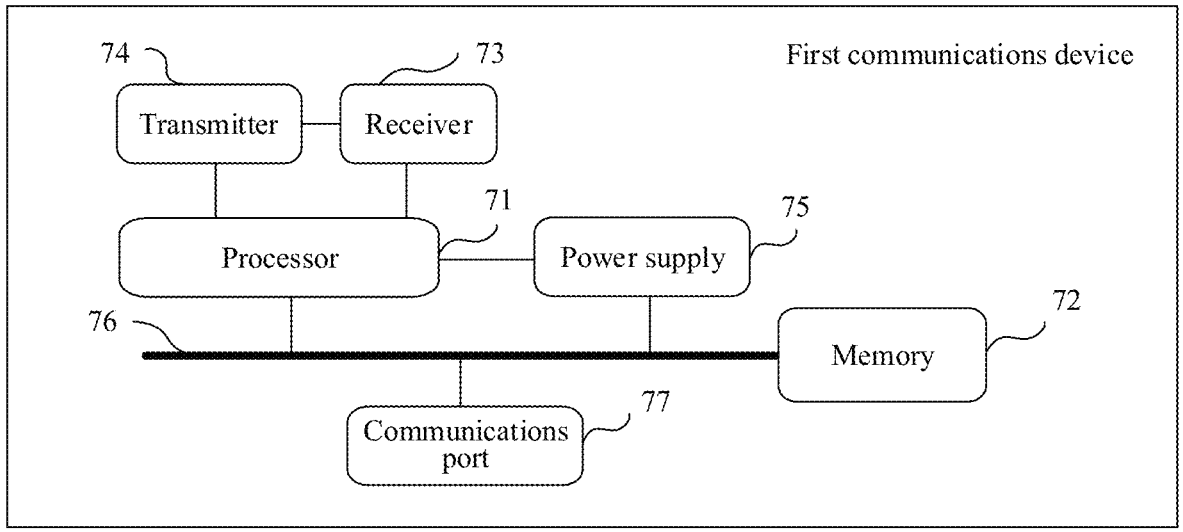
FIG. 7 is a schematic structural diagram of another first communications device according to an embodiment.

FIG. 7 is a schematic structural diagram of another device according to an embodiment. The device is a first communications device, and the first communications device may include a processor (for example, a CPU) 71, a memory 72, a transmitter 74, and a receiver 73. The transmitter 74 and the receiver 73 are coupled to the processor 71, and the processor 71 controls a sending action of the transmitter 74 and a receiving action of the receiver 73. The memory 72 may include a high-speed RAM memory, and may further include a nonvolatile memory NVM, for example, at least one magnetic disk memory. The memory 72 may store various instructions, to complete various processing functions and implement the method operations disclosed herein. In an embodiment, the first communications device in an embodiment may further include one or more of a power supply 75, a communications bus 76, and a communications port 77. The receiver 73 and the transmitter 74 may be integrated into a transceiver of the first communications device, or may be independent receive and transmit antennas of the first communications device. The communications bus 76 is configured to implement a communication connection between the components. The communications port 77 is configured to implement a communication connection between the first communications device and another peripheral device.

In an embodiment, the memory 72 is configured to store computer-executable program code, and the program code includes instructions. When the processor 71 executes the instructions, the instructions enable the processor 71 to perform a processing action of the first communications device in the foregoing methods disclosed herein, and enable the transmitter 74 to perform a sending action of the first communications device in the foregoing methods. Implementation principles and technical effects are similar. Details are not described herein again.

Figure 8:
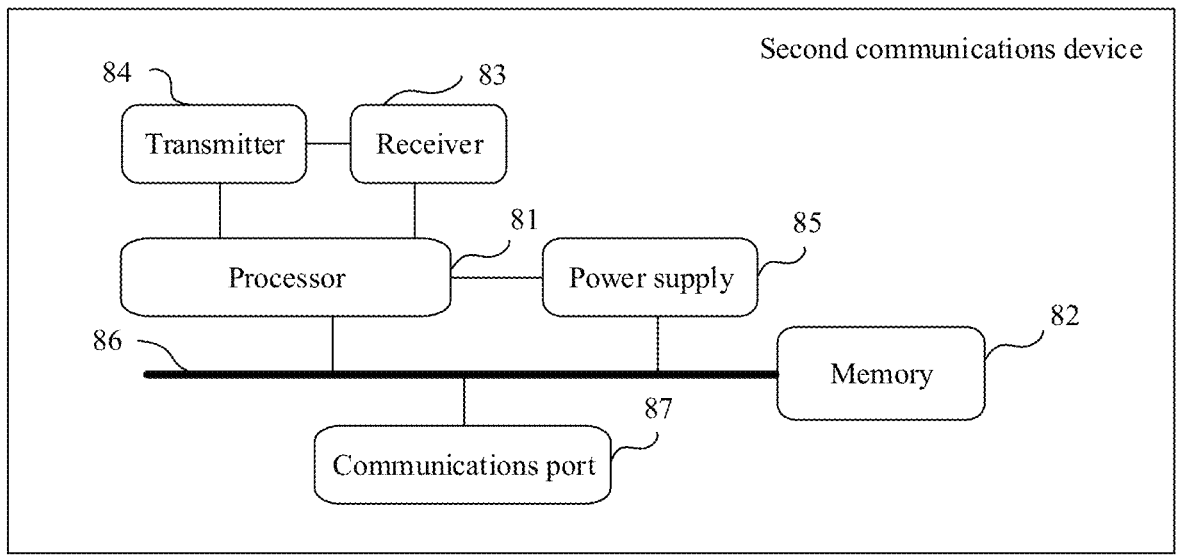
FIG. 8 is a schematic structural diagram of another second communications device according to an embodiment.

FIG. 8 is a schematic structural diagram of another device according to an embodiment. The device is a second communications device, and the second communications device may include a processor (for example, a CPU) 81, a memory 82, a receiver 83, and a transmitter 84. The receiver 83 and the transmitter 84 are coupled to the processor 81, and the processor 81 controls a receiving action of the receiver 83 and a sending action of the transmitter 84. The memory 82 may include a high-speed RAM memory, and may further include a nonvolatile memory NVM, for example, at least one magnetic disk memory. The memory 82 may store various instructions, to complete various processing functions and implement the method operations in an embodiment. In an embodiment, the second communications device in an embodiment may further include one or more of a power supply 85, a communications bus 86, and a communications port 87. The receiver 83 and the transmitter 84 may be integrated into a transceiver of the second communications device, or may be independent receive and transmit antennas of the second communications device. The communications bus 86 is configured to implement a communication connection between the components. The communications port 87 is configured to implement a communication connection between the second communications device and another peripheral device.

In another possible design, when the communications device is a terminal device or a chip in a terminal device, the chip includes a processing unit and a communications unit. The processing unit may be, for example, a processor. The communications unit may be, for example, an input/output interface, a pin, or a circuit. The processing unit may execute computer-executable instructions stored in a storage unit, so that the chip in the terminal is enabled to perform the wireless communication methods disclosed herein. In an embodiment, the storage unit may be a storage unit in the chip, such as a register or a buffer, or the storage unit may be a storage unit in the terminal but outside the chip, such as a read-only memory (ROM), another type of static storage device capable of storing static information and instructions, or a random access memory (RAM).

The processor mentioned above may be a general-purpose CPU, a microprocessor, an application-specific integrated circuit (ASIC), or one or more integrated circuits configured to control program execution of the wireless communication methods disclosed herein.

In addition, it should be noted that the described apparatuses discussed herein are merely examples. The units described as separate parts may or may not be physically separate, and parts displayed as units may or may not be physical units, and may be located in one position, or may be distributed on a plurality of network units. Some or all the modules may be selected based on actual needs to achieve the objectives of the solutions disclosed herein. In addition, in the accompanying drawings of the apparatuses disclosed herein, connection relationships between modules indicate that the modules have communication connections with each other, which may be implemented as one or more communications buses or signal cables. A person of ordinary skill in the art may understand and implement embodiments without creative efforts.

Based on the descriptions of the foregoing implementations, a person skilled in the art may clearly understand that this application may be implemented by software in addition to universal hardware, or certainly may be implemented by dedicated hardware, including a dedicated integrated circuit, a dedicated CPU, a dedicated memory, a dedicated component, and the like. Usually, all functions completed by a computer program may be easily implemented by using corresponding hardware, and a hardware structure used to implement a same function may also be of various forms, for example, a form of an analog circuit, a digital circuit, or a dedicated circuit. However, in this application, a software program implementation is a better implementation in most cases. Based on such an understanding, the technical solutions of this application essentially or the part contributing to the current technology may be implemented in a form of a software product. The software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods in an embodiment.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some of the procedures or the functions disclosed herein are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. A data processing method, comprising:
   receiving, by a first communications device, first information from a second communications device, wherein the first information is used to indicate maximum transport block quantity information and one or more of transport block set information, transport block information, or first combination set information; the transport block set information indicates a transport block quantity range and/or a transport block quantity set; the maximum transport block quantity information indicates a maximum quantity of transport blocks that can be scheduled by using control information; the transport block information indicates one or more of a quantity of transport blocks scheduled by using the control information, a hybrid automatic repeat request (HARQ) process number of a first transport block in the transport blocks scheduled by using the control information, or HARQ process numbers of all the transport blocks scheduled by using the control information; and each combination in the first combination set is used to determine the quantity of transport blocks scheduled by using the control information and a HARQ process number of the first transport block in the transport blocks scheduled by using the control information, or is used to determine the HARQ process numbers of all the transport blocks scheduled by using the control information;
   determining, by the first communications device based on the first information, the quantity of transport blocks scheduled by using the control information, and a HARQ process number corresponding to each transport block in the transport blocks scheduled by using the control information; and
   sending, by the first communications device, data to the second communications device based on the quantity of transport blocks scheduled by using the control information and the HARQ process number corresponding to each transport block in the transport blocks scheduled by using the control information, or receiving, by the first communications device, data from the second communications device based on the quantity of transport blocks scheduled by using the control information and the HARQ process number corresponding to each transport block in the transport blocks scheduled by using the control information.

2. The method according to claim 1, wherein the receiving, by the first communications device, the first information sent by the second communications device comprises:
   receiving, by the first communications device, higher layer signaling from the second communications device, wherein the higher layer signaling comprises the first information; or
   receiving, by the first communications device, the control information from the second communications device, wherein the control information comprises the first information.

3. The method according to claim 1, wherein the first information comprises a first field, wherein
   when a bit state of the first field is a first state, the first field indicates that the control information is used to schedule one transport block; or
   when a bit state of the first field is a second state, the first field indicates that the control information is used to schedule a plurality of transport blocks; and
   the first field comprises one or more bits, the first state comprises one or more bit states of the first field, and the second state comprises one or more bit states of the first field.

4. The method according to claim 1, wherein the control information is used to schedule a plurality of transport blocks; and
   the HARQ process numbers of the plurality of transport blocks, other than the first transport block in the plurality of transport blocks, are determined based on a HARQ process number of the first transport block in the plurality of transport blocks; and/or each transport block in the plurality of transport blocks corresponds to one HARQ process number of the HARQ process numbers, and the HARQ process numbers corresponding to the plurality of transport blocks are consecutive.

5. The method according to claim 1, wherein the HARQ process numbers corresponding to a plurality of transport blocks, other than the first transport block in the plurality of transport blocks, are determined in ascending order based on the HARQ process number corresponding to the first transport block in the plurality of transport blocks; or a value Rn of a HARQ process number of an $n^{th}$ transport block in the plurality of transport blocks satisfies:

$$Rn=\{R1+n-1\} \bmod N, \text{ wherein}$$

R1 is a value of the HARQ process number of the first transport block in the plurality of transport blocks, n is a positive integer, mod indicates a modulo operation, and N is a maximum quantity of HARQ processes supported by the control information.

6. A data processing method, comprising:

determining, by a second communications device, a quantity of transport blocks scheduled by using control information, and a hybrid automatic repeat request (HARQ) process number corresponding to each transport block in the transport blocks scheduled by using the control information;

generating, by the second communications device, first information, and sending the first information to a first communications device, wherein the first information is used to indicate maximum transport block quantity information and one or more of transport block set information, transport block information, or first combination set information; the transport block set information indicates a transport block quantity range and/or a transport block quantity set; the maximum transport block quantity information indicates a maximum quantity of transport blocks that can be scheduled by using the control information; the transport block information indicates one or more of the quantity of transport blocks scheduled by using the control information, an HARQ process number of a first transport block in the transport blocks scheduled by using the control information, or HARQ process numbers of all the transport blocks scheduled by using the control information; and each combination in the first combination set is used to determine the quantity of transport blocks scheduled by using the control information and a HARQ process number of the first transport block in the transport blocks scheduled by using the control information, or is used to determine the HARQ process numbers of all the transport blocks scheduled by using the control information; and sending, by the second communications device, data to the first communications device based on the quantity of transport blocks scheduled by using the control information and the HARQ process number corresponding to each transport block in the transport blocks scheduled by using the control information, or receiving, by the second communications device, data from the first communications device based on the quantity of transport blocks scheduled by using the control information and the HARQ process number corresponding to each transport block in the transport blocks scheduled by using the control information.

7. The method according to claim 6, wherein the sending, by the second communications device, the first information to the first communications device comprises:

sending, by the second communications device, higher layer signaling to the first communications device, wherein the higher layer signaling comprises the first information; or sending, by the second communications device, the control information to the first communications device, wherein the control information comprises the first information.

8. The method according to claim 6, wherein the first information comprises a first field, wherein when a bit state of the first field is a first state, the first field indicates that the control information is used to schedule one transport block; or when a bit state of the first field is a second state, the first field indicates that the control information is used to schedule a plurality of transport blocks; and the first field comprises one or more bits, the first state comprises one or more bit states of the first field, and the second state comprises one or more bit states of the first field.

9. The method according to claim 6, wherein the control information is used to schedule a plurality of transport blocks; and the HARQ process numbers of the plurality of transport blocks, other than the first transport block in the plurality of transport blocks, are determined based on a HARQ process number of the first transport block in the plurality of transport blocks; and/or each transport block in the plurality of transport blocks corresponds to one HARQ process number of the HARQ process numbers, and the HARQ process numbers corresponding to the plurality of transport blocks are consecutive.

10. The method according to claim 6, wherein the HARQ process numbers corresponding to a plurality of transport blocks, other than the first transport block in the plurality of transport blocks are determined in ascending order based on the HARQ process number corresponding to the first transport block in the plurality of transport blocks; or a value Rn of a HARQ process number of an $n^{th}$ transport block in the plurality of transport blocks satisfies:

$$Rn=\{R1+n-1\} \bmod N, \text{ wherein}$$

R1 is a value of the HARQ process number of the first transport block in the plurality of transport blocks, n is a positive integer, mod indicates a modulo operation, and N is a maximum quantity of HARQ processes supported by the control information.

11. A communications device, wherein the communications device is a first communications device, and the first communications device comprises:

at least one processor; and one or more memories coupled to the at least one processor and storing programming instructions for execution by the at least one processor to:

receive first information from a second communications device, wherein the first information is used to indicate maximum transport block quantity information and one or more of transport block set information, transport block information, or first combination set information; the transport block set information indicates a transport block quantity range and/or a transport block quantity set; the maximum transport block quantity information indicates a maximum quantity of transport blocks that can be scheduled by using control information; the transport block information indicates one or more of a quantity of transport blocks scheduled by using the control information, a hybrid automatic repeat request (HARQ) process number of a first transport block in the transport blocks scheduled by using the control information, or HARQ process numbers of all the transport blocks scheduled by using the control information; and each combination in the first combination set is used to determine the quantity of transport blocks scheduled by using the control information and a HARQ process number of the first transport block in the transport blocks scheduled by using the control information, or is used to determine the HARQ process numbers of all the transport blocks scheduled by using the control information;

determine, based on the first information, the quantity of transport blocks scheduled by using the control information, and a HARQ process number corresponding to each transport block in the transport blocks scheduled by using the control information; and send data to the second communications device based on the quantity of transport blocks scheduled by using the control information and the HARQ process number corresponding to each transport block in the transport blocks scheduled by using the control information; or receive data from the second communications device based on the quantity of transport blocks scheduled by using the control information and the HARQ process number corresponding to each transport block in the transport blocks scheduled by using the control information.

12. The communications device according to claim 11, wherein receiving the first information from the second communication device comprises:
receiving higher layer signaling from the second communications device, wherein the higher layer signaling comprises the first information; or
receiving the control information from the second communications device, wherein the control information comprises the first information.

13. The communications device according to claim 11, wherein
the first information comprises a first field, wherein
when a bit state of the first field is a first state, the first field indicates that the control information is used to schedule one transport block; or
when a bit state of the first field is a second state, the first field indicates that the control information is used to schedule a plurality of transport blocks; and
the first field comprises one or more bits, the first state comprises one or more bit states of the first field, and the second state comprises one or more bit states of the first field.

14. The communications device according to claim 11, wherein the control information is used to schedule a plurality of transport blocks; and
the HARQ process numbers of the plurality of transport blocks, other than the first transport block in the plurality of transport blocks, are determined based on a HARQ process number of the first transport block in the plurality of transport blocks; and/or
each transport block in the plurality of transport blocks corresponds to one HARQ process number of the HARQ process numbers, and the HARQ process numbers corresponding to the plurality of transport blocks are consecutive.

15. The communications device according to claim 11, wherein
the HARQ process numbers corresponding to a plurality of transport blocks, other than the first transport block in the plurality of transport blocks, are determined in ascending order based on the HARQ process number corresponding to the first transport block in the plurality of transport blocks; or
a value Rn of a HARQ process number of an $n^{th}$ transport block in the plurality of transport blocks satisfies:

$$Rn=\{R1+n-1\} \bmod N, \text{ wherein}$$

R1 is a value of the HARQ process number of the first transport block in the plurality of transport blocks, n is a positive integer, mod indicates a modulo operation, and N is a maximum quantity of HARQ processes supported by the control information.

16. A communications device, wherein the communications device is a second communications device, and the second communications device comprises:
at least one processor; and
one or more memories coupled to the at least one processor and storing programming instructions for execution by the at least one processor to:
determine a quantity of transport blocks scheduled by using control information, and a hybrid automatic repeat request (HARQ) process number corresponding to each transport block in the transport blocks scheduled by using the control information;
generate first information;
send the first information to a first communications device, wherein
the first information is used to indicate maximum transport block quantity information and one or more of transport block set information, transport block information, or first combination set information; the transport block set information indicates a transport block quantity range and/or a transport block quantity set; the maximum transport block quantity information indicates a maximum quantity of transport blocks that can be scheduled by using the control information; the transport block information indicates one or more of the quantity of transport blocks scheduled by using the control information, an HARQ process number of a first transport block in the transport blocks scheduled by using the control information, or HARQ process numbers of all the transport blocks scheduled by using the control information; and each combination in the first combination set is used to determine the quantity of transport blocks scheduled by using the control information and a HARQ process number of the first transport block in the transport blocks scheduled by using the control information, or is used to determine the HARQ process numbers of all the transport blocks scheduled by using the control information; and
send data to the first communications device based on the quantity of transport blocks scheduled by using the control information and the HARQ process number corresponding to each transport block in the transport blocks scheduled by using the control information; or
receive data from the first communications device based on the quantity of transport blocks and the HARQ process number corresponding to each transport block in the transport blocks scheduled by using the control information.

17. The communications device according to claim 16, wherein sending the first information to a first communication device comprises:
sending higher layer signaling to the first communications device, wherein the higher layer signaling comprises the first information; or
sending the control information to the first communications device, wherein the control information comprises the first information.

18. The communications device according to claim 16, wherein
the first information comprises a first field, wherein
when a bit state of the first field is a first state, the first field indicates that the control information is used to schedule one transport block; or
when a bit state of the first field is a second state, the first field indicates that the control information is used to schedule a plurality of transport blocks; and
the first field comprises one or more bits, the first state comprises one or more bit states of the first field, and the second state comprises one or more bit states of the first field.

19. The communications device according to claim 16, wherein the control information is used to schedule a plurality of transport blocks; and
the HARQ process numbers of the plurality of transport blocks, other than the first transport block in the plurality of transport blocks, are determined based on a HARQ process number of the first transport block in the plurality of transport blocks; and/or
each transport block in the plurality of transport blocks corresponds to one HARQ process number of the HARQ process numbers, and the HARQ process numbers corresponding to the plurality of transport blocks are consecutive.

20. The communications device according to claim 16, wherein
the HARQ process numbers corresponding to a plurality of transport blocks, other than the first transport block in the plurality of transport blocks, are determined in ascending order based on the HARQ process number corresponding to the first transport block in the plurality of transport blocks; or
a value $R_n$ of a HARQ process number of an $n^{th}$ transport block in the plurality of transport blocks satisfies:

$$R_n = \{R_1 + n - 1\} \bmod N, \text{ wherein}$$

$R_1$ is a value of the HARQ process number of the first transport block in the plurality of transport blocks, n is a positive integer, mod indicates a modulo operation, and N is a maximum quantity of HARQ processes supported by the control information.

* * * * *